US010674481B2

(12) United States Patent
Chai et al.

(10) Patent No.: US 10,674,481 B2
(45) Date of Patent: Jun. 2, 2020

(54) CONNECTION ESTABLISHMENT METHOD AND USER EQUIPMENT

(71) Applicant: Huawei Technologies Co., Ltd., Shenzhen (CN)

(72) Inventors: Li Chai, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/457,664

(22) Filed: Mar. 13, 2017

(65) Prior Publication Data

US 2017/0188339 A1   Jun. 29, 2017

Related U.S. Application Data

(63) Continuation of application No. 14/736,112, filed on Jun. 10, 2015, now abandoned, which is a
(Continued)

(30) Foreign Application Priority Data

Nov. 22, 2011  (CN) .......................... 2011 1 0374011

(51) Int. Cl.
*H04W 72/04*   (2009.01)
*H04W 76/14*   (2018.01)
*H04W 88/02*   (2009.01)

(52) U.S. Cl.
CPC .......... *H04W 72/04* (2013.01); *H04W 76/14* (2018.02); *H04W 88/02* (2013.01)

(58) Field of Classification Search
CPC .......... H04W 76/048; H04W 36/0033; H04W 36/0061; H04W 76/04; H04W 76/041
(Continued)

(56) References Cited

U.S. PATENT DOCUMENTS 7,505,524 B2   3/2009 Lozhkin
7,551,548 B2   6/2009 Kasami et al.
(Continued)

FOREIGN PATENT DOCUMENTS

CN   101179356 A   5/2008
CN   101772199 A   7/2010
(Continued)

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 10)," 3GPP TS 36.413, V10.3.0, pp. 1-254, 3rd Generation Partnership Project, Valbonne, France, (Sep. 2011).
(Continued)

*Primary Examiner* — Edan Orgad
*Assistant Examiner* — Emmanuel K Maglo
(74) *Attorney, Agent, or Firm* — Leydig, Voit & Mayer, Ltd.

(57) ABSTRACT

The present disclosure provides a connection establishment method and a user equipment. The connection establishment method includes: acquiring, by a second user equipment supporting a device to device (D2D) function, first user equipment information of a first user equipment supporting the D2D function; and initiating, by the second user equipment, a connection establishment process with a network-side device after the second user equipment determines that a connection with the first user equipment is established according to the first user equipment information, and sending the first user equipment information to the network-side device in the connection establishment process, so that a connection is established between the network-side device and the first user equipment. The present disclosure can realize establishment of a DPS bearer between the user
(Continued)

equipments supporting the D2D function, realize communication between the user equipments supporting the D2D function and further realize resource controllability of a network.

12 Claims, 13 Drawing Sheets

Related U.S. Application Data continuation of application No. 14/281,487, filed on May 19, 2014, now Pat. No. 9,084,222, which is a continuation of application No. PCT/CN2012/085016, filed on Nov. 22, 2012.

(58) Field of Classification Search
USPC .................................................. 370/329, 331
See application file for complete search history.

(56) References Cited

U.S. PATENT DOCUMENTS

| | | | |
|---|---|---|---|
| 8,520,758 B2 | 8/2013 | Bellanger | |
| 8,554,200 B2 | 10/2013 | Ribeiro et al. | |
| 8,582,593 B2 | 11/2013 | Chen et al. | |
| 8,687,720 B2 | 4/2014 | Berg | |
| 8,825,040 B2 | 9/2014 | Hooli et al. | |
| 8,989,389 B2 | 3/2015 | Hakola et al. | |
| 9,084,222 B2 | 7/2015 | Chai et al. | |
| 2004/0252772 A1 | 12/2004 | Renfors et al. | |
| 2005/0271026 A1 | 12/2005 | Song et al. | |
| 2006/0056551 A1 | 3/2006 | Lozhkin | |
| 2006/0247928 A1 | 11/2006 | Cowdery | |
| 2007/0064669 A1 | 3/2007 | Classon et al. | |
| 2008/0259905 A1 | 10/2008 | Connors et al. | |
| 2008/0298319 A1 | 12/2008 | Lee et al. | |
| 2009/0036130 A1* | 2/2009 | Diachina | H04W 36/0022 455/436 |
| 2009/0213949 A1 | 8/2009 | Javaudin | |
| 2009/0318154 A1 | 12/2009 | Lee et al. | |
| 2009/0326959 A1 | 12/2009 | Herre et al. | |
| 2010/0009675 A1* | 1/2010 | Wijting | H04W 76/14 455/426.1 |
| 2010/0015923 A1 | 1/2010 | Golitschek | |
| 2010/0041350 A1 | 2/2010 | Zhang et al. | |
| 2010/0093364 A1* | 4/2010 | Ribeiro | H04W 72/082 455/452.2 |
| 2010/0169498 A1 | 7/2010 | Palanki et al. | |
| 2011/0045826 A1* | 2/2011 | Kim | H04W 8/082 455/426.1 |
| 2011/0098043 A1* | 4/2011 | Yu | H04W 60/00 455/435.1 |
| 2011/0106952 A1 | 5/2011 | Doppler et al. | |
| 2011/0134827 A1 | 6/2011 | Hooli et al. | |
| 2011/0142152 A1 | 6/2011 | Bellanger | |
| 2011/0170517 A1* | 7/2011 | Bakker | H04W 36/0033 370/331 |
| 2011/0173010 A1 | 7/2011 | Lecomte et al. | |
| 2011/0202337 A1 | 8/2011 | Fuchs et al. | |
| 2011/0222511 A1* | 9/2011 | Weng | H04L 41/085 370/331 |
| 2012/0064892 A1* | 3/2012 | Kim | H04W 8/26 455/435.1 |
| 2012/0106423 A1* | 5/2012 | Nylander | H04W 52/0241 370/311 |
| 2012/0134344 A1 | 5/2012 | Yu et al. | |
| 2012/0140701 A1* | 6/2012 | Huang | H04B 7/15528 370/315 |
| 2012/0189036 A1 | 7/2012 | Bellanger | |
| 2012/0195255 A1* | 8/2012 | Nylander | H04W 60/04 370/328 |
| 2012/0202491 A1* | 8/2012 | Fox | H04B 7/2609 455/435.1 |
| 2012/0207100 A1 | 8/2012 | Hakola et al. | |
| 2012/0243625 A1 | 9/2012 | Berg | |
| 2012/0281551 A1 | 11/2012 | Alanaerae et al. | |
| 2012/0294163 A1* | 11/2012 | Turtinen | H04W 72/042 370/252 |
| 2013/0003699 A1* | 1/2013 | Liu | H04W 8/082 370/331 |
| 2013/0010623 A1 | 1/2013 | Golitschek | |
| 2013/0051327 A1* | 2/2013 | Kim | H04W 8/082 370/328 |
| 2013/0128873 A1* | 5/2013 | Eipe | H04W 76/02 370/338 |
| 2013/0157659 A1* | 6/2013 | Ikeda | H04W 12/08 455/435.1 |
| 2013/0159522 A1* | 6/2013 | Hakola | H04L 63/0823 709/225 |
| 2013/0160101 A1 | 6/2013 | Hakola et al. | |
| 2013/0195026 A1 | 8/2013 | Johnsson et al. | |
| 2013/0223332 A1 | 8/2013 | Wu et al. | |
| 2013/0286959 A1 | 10/2013 | Lou et al. | |
| 2013/0287012 A1 | 10/2013 | Pragada et al. | |
| 2013/0288668 A1* | 10/2013 | Pragada | H04W 12/06 455/426.1 |
| 2014/0003333 A1* | 1/2014 | Ivershen | H04W 24/08 370/328 |
| 2014/0073337 A1 | 3/2014 | Hong et al. | |
| 2014/0092885 A1 | 4/2014 | Venkatachalam et al. | |
| 2014/0177449 A1* | 6/2014 | Novak | H04W 4/70 370/241 |
| 2014/0254429 A1* | 9/2014 | Wang | H04L 5/0037 370/254 |
| 2014/0314057 A1* | 10/2014 | Van Phan | H04W 56/0045 370/336 |
| 2015/0092665 A1* | 4/2015 | Choi | H04W 76/062 370/328 |
| 2016/0183156 A1* | 6/2016 | Chin | H04W 36/0022 370/331 |

FOREIGN PATENT DOCUMENTS

| | | |
|---|---|---|
| CN | 101867547 A | 10/2010 |
| CN | 102090132 A | 6/2011 |
| CN | 102244873 A | 11/2011 |
| CN | 102469589 | 5/2012 |
| EP | 2362596 A1 | 8/2011 |
| WO | 2010076044 A1 | 7/2010 |
| WO | 2011109027 A1 | 9/2011 |
| WO | 2013173992 A1 | 11/2013 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 11)," 3GPP TS 24.301, V11.0.0, pp. 1-323, 3rd Generation Partnership Project, Valbonne, France, (Sep. 2011).

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.3.0, pp. 1-296, 3rd Generation Partnership Project, Valbonne, France, (Sep. 2011).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300, V10.5.0, pp. 1-194, 3rd Generation Partnership Project, Valbonne, France, (Sep. 2011).

3rd Generation Partnership Project; Technical Specification Group Services and System Aspects; General Packet Radio Service (GPRS) enhancements for Evolved Universal Terrestrial Radio Access Network (E-UTRAN) access (Release 10), 3GPP TS 23.401 V10.5.0, pp. 1-282, 3rd Generation Partnership Project, Valbonne, France, (Sep. 2011).

Stitz et al.,"CFO estimation and correction in a WiMAX-like FBMC system," IEEE, pp. 1-5, XP031487904, Institute of Electrical and Electronics Engineers, New York, New York, (2009).

(56) References Cited

OTHER PUBLICATIONS

Ringset et al.,"Performance of a FilterBank MultiCarrier(FBMC) Physical Layer in the WiMAX Context," Future Network & MobileSummit 2010 Conference Proceedings, pp. 1-8, XP031921958, IIMC International Information Management Corporation, Dublin, Ireland, (2010).

"5G Waveform Candidate Selection; D3.1," 5GNOW, pp. 1-110, XP055175081, (Nov. 11, 2013).

Abdoli et al.,"Weighted Circularly Convolved Filtering in OFDM/OQAM," IEEE 24th International Symposium on Personal, Indoor and Mobile Radio Communications, pp. 657-661, XP055250145, Institute of Electrical and Electronics Engineers, New York, New York, (2013).

Baltar et al., "Duplexing and multiple access techniques, software description," PHYDYAS, pp. 1-98, ICT-211887, Seventh Framework Programme, (Jan. 1, 2009).

Schaich, et al. "PHYDYAS—PHYsical layer for DYnamic AccesS and cognitive radio, Compability of OFDM and FBMC systems and reconfigurability of terminals" FP7-ICT Future Networks, Specific Targetted Research Project, Project Deliverable, ICT-211887, D7.1, pp. 1-52 (2009).

\* cited by examiner

CONNECTION ESTABLISHMENT METHOD AND USER EQUIPMENT

CROSS-REFERENCE TO RELATED APPLICATIONS

This application is a continuation of U.S. patent application Ser. No. 14/736,112, filed on Jun. 10, 2015, which is a continuation of U.S. patent application Ser. No. 14/281,487, filed on May 19, 2014 (now U.S. Pat. No. 9,084,222), which is a continuation of International Patent Application No. PCT/CN2012/085016, filed on Nov. 22, 2012, which claims priority to Chinese Patent Application No. 201110374011.2, filed on Nov. 22, 2011. The afore-mentioned patent applications are hereby incorporated by reference in their entireties.

FIELD OF TECHNOLOGY

The present disclosure relates to the field of communication technologies, and particularly, to a connection establishment method and a user equipment.

BACKGROUND

A device to device (D2D) communication technology may realize services and data applications of a local ad-hoc network and short-distance communication.

In order to improve the utilization rate of frequency spectra, a D2D system and a cellular system share a same resource. When a D2D terminal in the D2D system is connected to the cellular system, it should follow time and time slot of the cellular system. The D2D system may support services such as information sharing, games, social services, mobile advertising and the like.

In the prior art, the D2D terminal in the D2D system independently performs communication matching with other D2D terminal(s) by using its own perceptive function according to a perceived result, which does not need control and allocation of an evolved packet core (EPC)/evolved universal mobile telecommunications system terrestrial radio access network (E-UTRAN), and is not authenticated and authorized by an operator network, and thus is not favorable for reasonable allocation of resources and secure operation of networks.

SUMMARY

The present disclosure provides a connection establishment method and a user equipment, for realizing communication between user equipments supporting a D2D function and realizing resource controllability of a network.

One aspect of the present disclosure provides a connection establishment method, including:

acquiring, by a second user equipment supporting a device to device (D2D) function, first user equipment information broadcasted by a first user equipment supporting the D2D function; and initiating, by the second user equipment, a connection establishment process with a network-side device after the second user equipment determines that a connection with the first user equipment is established according to the first user equipment information, and sending the first user equipment information to the network-side device in the connection establishment process, so as a connection is established between the network-side device and the first user equipment.

Another aspect of the present disclosure provides a user equipment, wherein the user equipment is a second user equipment supporting a D2D function, and the user equipment includes:

an acquiring module, configured to acquire first user equipment information broadcasted by a first user equipment supporting the D2D function;

a determining module, configured to determine that a connection with the first user equipment is established according to the first user equipment information acquired by the acquiring module; and an initiating module, configured to initiate a connection establishment process with a network-side device and send the first user equipment information to the network-side device in the connection establishment process, so that a connection is established between the network-side device and the first user equipment.

Through embodiments of the present disclosure, after the second user equipment determines that the connection with the first user equipment is established according to the information broadcasted by the first user equipment, the second user equipment initiates the connection establishment process with the network-side device and sends the first user equipment information to the network-side device in the connection establishment process, so that a connection is established between the network-side device and the first user equipment. Therefore, a D2D evolved packet system (DPS) bearer can be established between the user equipments supporting the D2D function, communication between the user equipment supporting the D2D function is realized, and resource controllability of the network can further be realized.

BRIEF DESCRIPTION OF THE DRAWINGS

To illustrate technical solutions in the embodiments of the present disclosure more clearly, a brief introduction on the accompanying drawings which are needed in the description of the embodiments or the prior art is given below. Apparently, the accompanying drawings in the description below are merely some of the embodiments of the present disclosure, based on which other drawings can be obtained by those of ordinary skill in the art without any creative effort.

DETAILED DESCRIPTION OF THE EMBODIMENTS

To make objectives, technical solutions and advantages of embodiments of the present disclosure clearer, a clear and complete description of the technical solutions in the embodiments of the present disclosure will be given below, in combination with the accompanying drawings in the embodiments of the present disclosure. Apparently, the embodiments described are merely a part, but not all, of the embodiments of the present disclosure. All of other embodiments, obtained by those of ordinary skill in the art based on the embodiments of the present disclosure without any creative effort, fall into the protection scope of the present disclosure.

Figure 1:
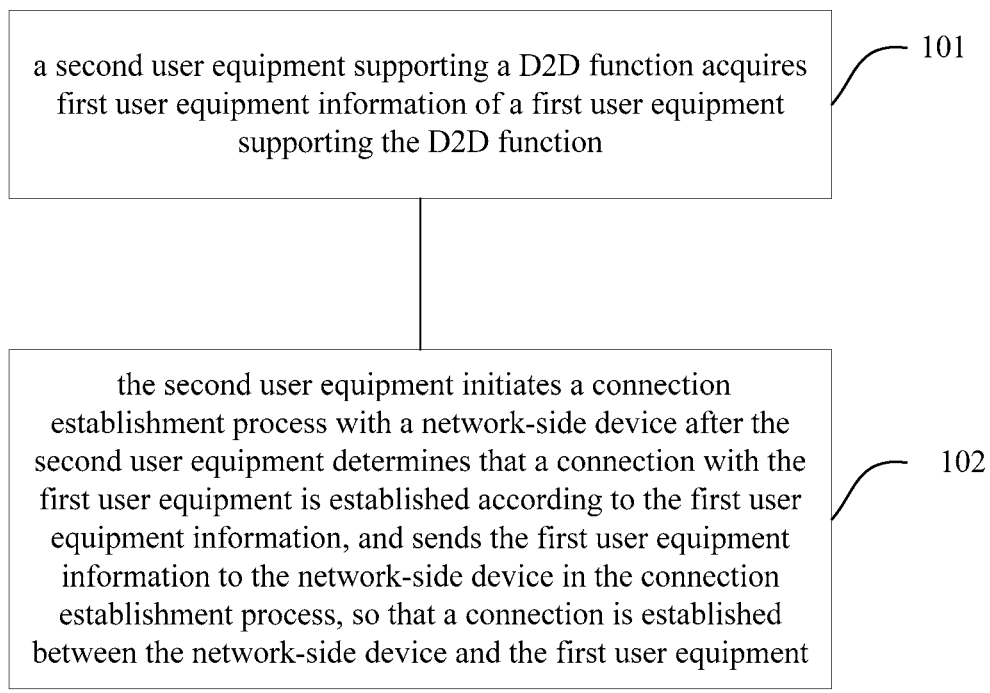
FIG. 1 is a flowchart of an embodiment of a connection establishment method according to the present disclosure.

FIG. 1 is a flowchart of an embodiment of a connection establishment method according to the present disclosure. As shown in FIG. 1, the connection establishment method may include:

Step 101, a second user equipment supporting a D2D function acquires first user equipment information of a first user equipment supporting the D2D function.

Step 102, the second user equipment initiates a connection establishment process with a network-side device after the second user equipment determines that a connection with the first user equipment is established according to the first user equipment information, and sends the first user equipment information to the network-side device in the connection establishment process, so that a connection is established between the network-side device and the first user equipment.

In this embodiment, the above-mentioned first user equipment information includes service information of the first user equipment and an identifier of the first user equipment. Or, the above-mentioned first user equipment information includes a service code, wherein the service code is used for indicating the service information of the first user equipment and the identifier of the first user equipment.

In this embodiment, after the second user equipment initiates the connection establishment process with the network-side device and the connection is established between the network-side device and the first user equipment, establishment of a DPS bearer between the second user equipment and the first user equipment is completed, and the second user equipment and the first user equipment start D2D communication.

Specifically, the step that the second user equipment initiates the connection establishment process with the network-side device and sends the first user equipment information to the network-side device in the connection establishment process, so that the connection is established between the network-side device and the first user equipment may be that: the second user equipment sends a radio resource control connection establishment request message to a serving base station of a current cell of the second user equipment; and after receiving a radio resource control connection establishment response message sent by the above-mentioned serving base station, the second user equipment sends a radio resource control connection establishment complete message to the above-mentioned serving base station, wherein the above-mentioned radio resource control connection establishment complete message carries non-access stratum signaling of the second user equipment, such as service request signaling.

A value of an establishment cause information element of the above-mentioned radio resource control connection establishment request message is a D2D connection; and/or, the above-mentioned radio resource control connection establishment complete message carries D2D capability information of the second user equipment, wherein the D2D capability information of the second user equipment is used for indicating that the second user equipment supports the D2D function; one or both of the above-mentioned radio resource control connection establishment request message and the above-mentioned radio resource control connection establishment complete message carry a non-access stratum identifier and an access stratum identifier of the first user equipment; and one or both of the above-mentioned radio resource control connection establishment request message and the above-mentioned radio resource control connection establishment complete message carry the service code of the first user equipment.

Further, the above-mentioned serving base station packages the above-mentioned non-access stratum signaling into an initial user equipment message and sends the initial user equipment message to a mobility management entity, wherein a value of an establishment cause information element of the initial user equipment message is a D2D connection, and the initial user equipment message carries the non-access stratum identifier of the first user equipment; and/or when the first user equipment is in a connected state, the above-mentioned initial user equipment message also carries the access stratum identifier of the first user equipment. Then, the serving base station receives an initial context setup request message sent by the mobility management entity, wherein the initial context setup request message is sent to the above-mentioned serving base station by the mobility management entity after the second user equipment passes authentication, and the initial context setup request message carries a D2D connection indicator. Next, the serving base station executes mapping of the second user equipment from a DPS bearer to a radio bearer, and the above-mentioned serving base station sends an initial context setup response message to the mobility management entity after the mapping from the DPS bearer to the radio bearer is completed, wherein the initial context setup response message carries an address of the above-mentioned serving base station, an accepted evolved packet system bearer list, a rejected evolved packet system bearer list and a tunnel endpoint identifier of an S1 port; wherein a D2D connection type indicator is added to an evolved universal terrestrial ratio access bearer identity in the above-mentioned accepted evolved packet system bearer list, or a dedicated packet data network connection for management of the DPS bearer is stipulated in an attach process.

In this embodiment, that the connection is established between the network-side device and the first user equipment may be as follows: the serving base station receives a first message sent by the mobility management entity, wherein the first message may be a paging message or a new message, and the first message carries a D2D connection type indicator, an identifier of the first user equipment and an identifier of the second user equipment; then, the serving base station sends a second message to the first user equipment, wherein the second message includes a paging message or a new message, and wherein the second message carries the D2D connection type indicator and the identifier of the second user equipment, so that the connection is established between the first user equipment and the above-mentioned network-side device.

In this embodiment, IP address allocation and quality-of-service management of the DPS bearer are completed by an entity with an internal gateway function. The above-mentioned entity with the internal gateway function is an independent entity or is integrated together with the above-mentioned serving base station.

Each dedicated DPS bearer corresponds to one traffic flow template. The second user equipment filters a traffic flow in a sending direction of the second user equipment to a DPS bearer corresponding to a TX traffic flow template of the second user equipment by using the TX traffic flow template of the second user equipment. The second user equipment acquires and saves a TX traffic flow template of the first user equipment, uses the TX traffic flow template of the first user equipment as a RX traffic flow template of the second user equipment, and determines a mapping relation between a traffic flow received by the above-mentioned second user equipment and a DPS bearer corresponding to the RX traffic flow template of the second user equipment according to the RX traffic flow template of the second user equipment. Specifically, that the second user equipment acquires the TX traffic flow template of the first user equipment may be as follows: the second user equipment acquires the TX traffic flow template of the first user equipment informed by the first user equipment in the above-mentioned DPS bearer establishment process; or, the second user equipment acquires the TX traffic flow template of the first user equipment informed by the first user equipment through a network.

Similarly, the first user equipment also filters a traffic flow in a sending direction of the first user equipment to a DPS bearer corresponding to a TX traffic flow template of the first user equipment by using the TX traffic flow template of the first user equipment. The first user equipment acquires and saves a TX traffic flow template of the second user equipment, uses the TX traffic flow template of the second user equipment as a RX traffic flow template of the first user equipment, and determines a mapping relation between a traffic flow received by the above-mentioned first user equipment and a DPS bearer corresponding to the RX traffic flow template of the first user equipment according to the RX traffic flow template of the first user equipment. Specifically, that the first user equipment acquires the TX traffic flow template of the second user equipment may be as follows: the first user equipment acquires the TX traffic flow template of the second user equipment informed by the second user equipment in the above-mentioned DPS bearer establishment process; or, the first user equipment acquires the TX traffic flow template of the second user equipment informed by the second user equipment through a network.

Further, in this embodiment, after the second user equipment determines, according to the first user equipment information, that the connection with the first user equipment is established, if no DPS bearer is established between the second user equipment and the above-mentioned serving base station in the attach process, the second user equipment initiates a request bearer resource modification flow to trigger establishment of a DPS bearer. Specifically, that the second user equipment initiates the request bearer resource modification flow to trigger the establishment of the DPS bearer may be as follows: the second user equipment sends a bearer resource modification request message to the mobility management entity, so that the above-mentioned mobility management entity sends the above-mentioned bearer resource modification request message to a gateway; wherein the bearer resource modification request message sent by the above-mentioned second user equipment carries an evolved packet system bearer identity and a linked bearer identity related with the DPS bearer, and wherein a D2D connection type indicator is added to the bearer resource modification request message sent by the second user equipment, or the bearer resource modification request message sent by the second user equipment has a dedicated packet data network connection for management of the DPS bearer.

Next, a packet data gateway receives a bearer resource modification request message sent after the above-mentioned gateway receives the bearer resource modification request message sent by the second user equipment, wherein the bearer resource modification request message sent by the above-mentioned gateway carries a linked bearer identity and an evolved packet system bearer identity related with the DPS bearer, and wherein a D2D connection type indicator is added to the bearer resource modification request message sent by the above-mentioned gateway, or the bearer resource modification request message sent by the above-mentioned gateway has a dedicated packet data network connection for management of the DPS bearer. After the bearer resource modification request message sent by the above-mentioned gateway is received, the packet data gateway initiates an establishment process for the DPS bearer of the second user equipment.

Further, after the packet data gateway initiates the establishment process for the DPS bearer of the second user equipment, the above-mentioned serving base station executes mapping of the second user equipment from the DPS bearer to a radio bearer; and after the packet data gateway initiates an establishment process for the DPS bearer of the first user equipment, the serving base station executes mapping of the first user equipment from the DPS bearer to a radio bearer.

Specifically, the establishment process for the DPS bearer initiated by the packet data gateway may be as follows: a serving gateway receives a create dedicated bearer request message sent by the above-mentioned packet data gateway, wherein the create dedicated bearer request message sent by the above-mentioned packet data gateway is sent to the above-mentioned serving gateway after the packet data gateway allocates quality of service of the evolved packet system bearer by using a local quality-of-service strategy; the above-mentioned serving gateway sends the create dedicated bearer request message to the mobility management entity, so that the above-mentioned mobility management entity constructs a session management request and sends a bearer establishment request message carrying the above-mentioned session management request to the above-mentioned serving gateway; wherein the create dedicated bearer request message sent by the above-mentioned serving gateway carries a linked bearer identity, and the above-mentioned session management request includes an evolved packet system bearer identity and a linked bearer identity. In this embodiment, a D2D connection type indicator is added to the above-mentioned linked bearer identity, or the above-mentioned linked bearer identity has a dedicated packet data network connection for management of the DPS bearer.

Further, in this embodiment, after the connection is established between the network-side device and the first user equipment, the second user equipment may also receive a D2D link establishment request message sent by the first user equipment, wherein the above-mentioned D2D link establishment request message carries an identifier of the first user equipment, an identifier of the second user equipment and channel state information and resource allocation condition of the first user equipment. After the above-mentioned D2D link establishment request message is received, if connection establishment is permitted, the second user equipment sends a D2D link establishment response message to the first user equipment, wherein the above-mentioned D2D link establishment response message carries the identifier of the second user equipment, the identifier of the first user equipment, channel state information of the second user equipment and an accepting or rejecting response of the second user equipment to the resource allocation condition of the first user equipment. And finally, the second user equipment receives a D2D link establishment complete message sent by the first user equipment.

In this embodiment, a protocol stack of an air interface between the first user equipment and the second user equipment includes a user plane protocol stack.

In an implementation of this embodiment, the above-mentioned user plane protocol stack may be a simplified protocol stack, and the user plane protocol stack is configured with information of one or a combination of Internet protocol (Internet protocol, IP for short below), media access control-d (MAC-d) and a physical (PHY) layer.

In another implementation of this embodiment, the above-mentioned user plane protocol stack may be configured with information of one or a combination of IP, packet data convergence protocol (PDCP), a radio link control (RLC) layer, a media access control (MAC) layer and a physical (PHY) layer.

In this embodiment, establishment of the DPS bearer between the second user equipment and the first user equipment and mapping from the DPS bearer to the radio bearer are controlled by the network-side device.

In the above-mentioned embodiment, after the second user equipment determines that the connection with the first user equipment is established according to the information broadcasted by the first user equipment, the second user equipment initiates the connection establishment process with the network-side device, and sends the first user equipment information to the network-side device in the connection establishment process, so that the connection is established between the network-side device and the first user equipment. Therefore, the DPS bearer may be established between the user equipments supporting the D2D function, communication between the user equipments supporting the D2D function is realized, and thus resource controllability of a network may further be realized.

It should be noted that, in an embodiment of the present disclosure, the DPS bearer is a D2D bearer, and the DPS bearer and the D2D bearer have the same meaning.

Figure 2A:
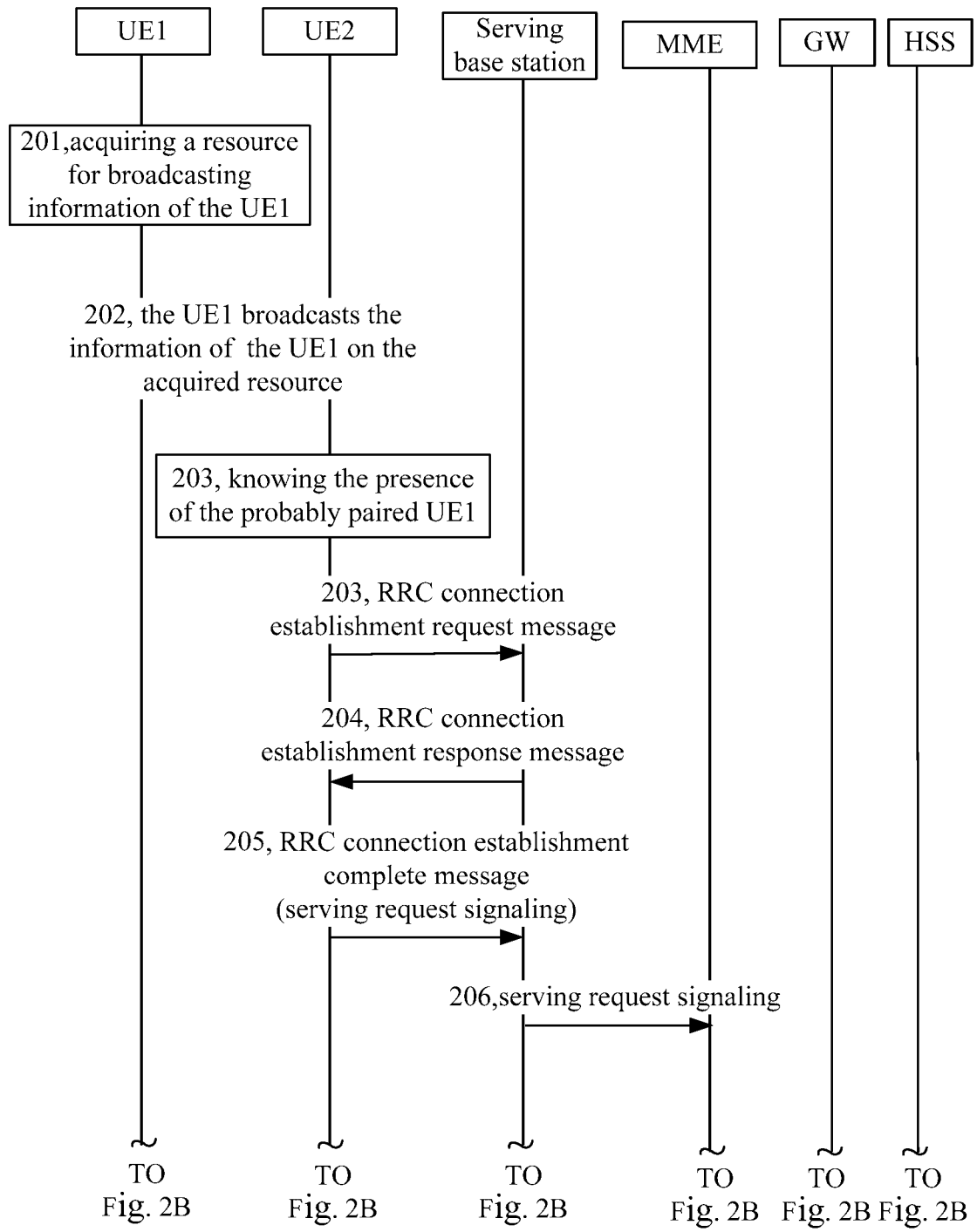
FIG. 2A and FIG. 2B are flowcharts of another embodiment of the connection establishment method according to the present disclosure.
Figure 2B:
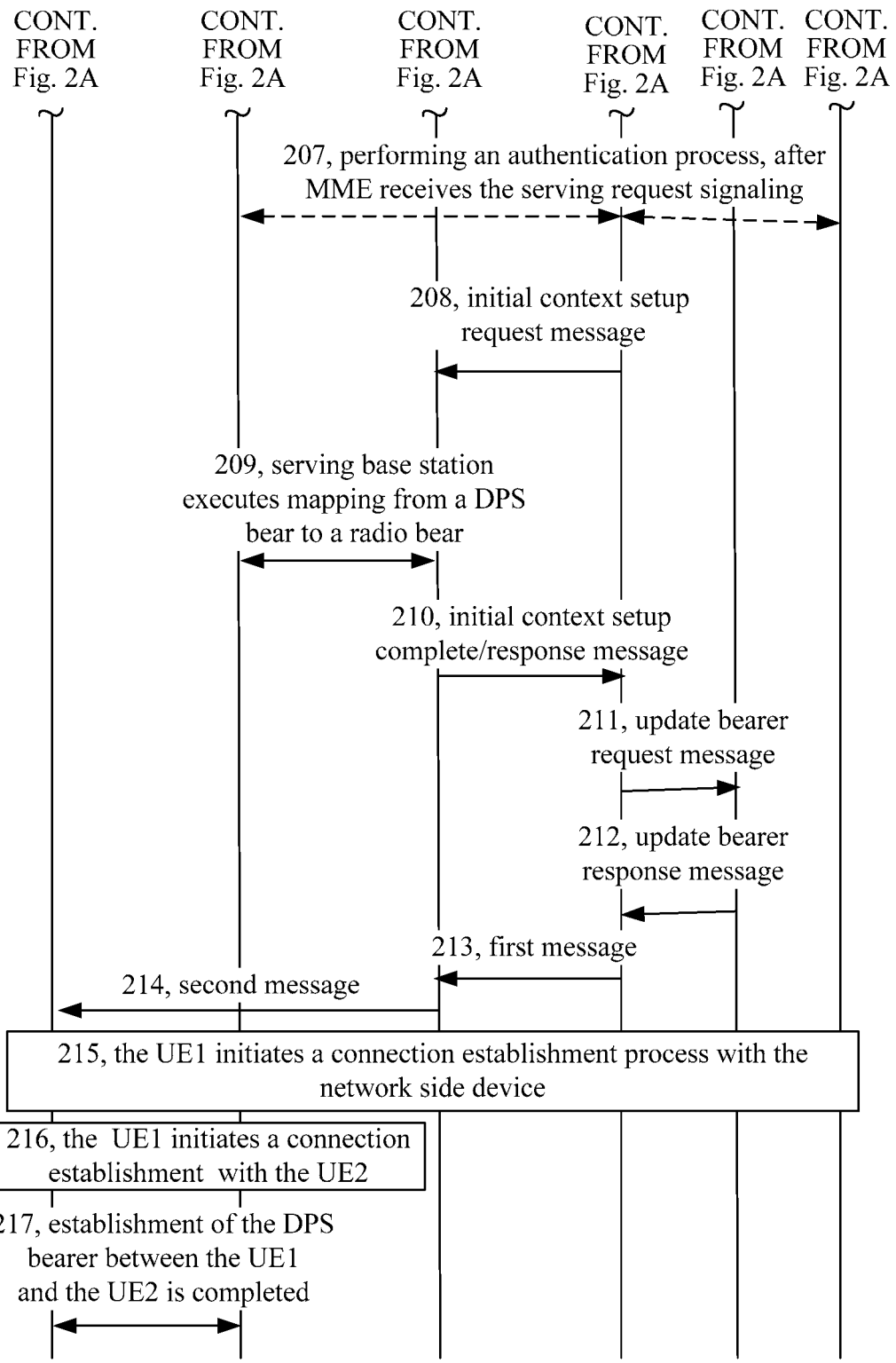

FIG. 2 is a flowchart of another embodiment of the connection establishment method of the present disclosure. As shown in FIG. 2, the connection establishment method may include:

Step 201, user equipment 1 (UE1) supporting a D2D function acquires a resource for broadcasting information of the UE1, wherein the information of the UE1 includes one or a combination of an identifier, service information, a service code and application layer service information of the UE1.

The above-mentioned identifier may be one or a combination of a physical identifier, a non-access stratum identifier (NAS ID) and an access stratum identifier (AS ID). For example, the physical identifier may be a specific code sequence such as an international mobile subscriber identification (IMSI) and the like; the NAS ID may be a serving temporary mobile subscriber identifier (s-TMSI) or a global unique temporary identifier (GUTI), wherein if the UE1 is in an idle state, an old s-TMSI or old GUTI saved last time may be used, and wherein if the UE1 is in a connected state, a current s-TMSI or current GUTI may be used; the AS ID may be a cell radio network temporary identifier (C-RNTI) or a D-RNTI (i.e., radio network temporary identifier (RNTI) for D2D).

The above-mentioned application layer service information includes user-readable service information, and the user-readable service information includes service type(s) and/or service content(s). For example, the service content(s) may be advertising information, videos of a certain movie, games or the like.

The above-mentioned service code may be a character, a character string or a digital sequence, and may represent the application layer service information; or the above-mentioned service code may indicate an identifier of the UE1 and one of the above-mentioned application layer service information and the above-mentioned service information.

The above-mentioned service information may be information of a non-access stratum (NAS) required for constructing the connection establishment request message of a service by the user equipment, and may include quality of service (QoS) information and the like.

Specifically, when the UE1 supporting the D2D function is started in a cell or is reselected to a new cell, the UE1 needs to acquire the resource for broadcasting the information of the UE1.

In an implementation of this embodiment, that the UE1 supporting the D2D function acquires the resource for broadcasting the information of the UE1 may be as follows: the UE1 acquires resource(s) which is previously allocated for user equipment(s) supporting the D2D function in the cell by a serving base station of the current cell of the above-mentioned UE1 and is used for broadcasting the above-mentioned information of the user equipment(s), wherein this resource is broadcasted by the serving base station through a broadcast message; and then, the UE1 selects a resource, the interference level of which is lower than a predefined threshold, from the resource(s) previously allocated by the above-mentioned serving base station through automatic search or measurement. Alternatively, the allocation mode of the serving base station is semi-static.

In another implementation of this embodiment, that the UE1 supporting the D2D function acquires the resource for broadcasting the information of the UE1 may be as follows: the UE1 selects a sub-resource, the interference level of which is lower than a predefined threshold, from sub-resource(s) broadcasted by the serving base station according to the interference level(s) of the sub-resource(s) broadcasted by the serving base station of the current cell of the above-mentioned UE1 and the position information of the above-mentioned sub-resource(s); wherein the above-mentioned sub-resource(s) is(are) acquired in a mode that the serving base station divides a resource which is previously allocated for the user equipment(s) supporting the D2D function in the above-mentioned cell by the serving base station and is used for broadcasting the above-mentioned information of the user equipment(s).

In a further implementation of this embodiment, that the UE1 supporting the D2D function acquires the resource for broadcasting the information of the UE1 may be as follows: the UE1 establishes a connection with the serving base station of the current cell of the above-mentioned UE1 to trigger the serving base station to allocate the resource for broadcasting the information of the UE1 for the UE1, no matter whether a real service of the UE1 exists. After the UE1 establishes the connection with the serving base station of the UE1, the UE1 may maintain a long discontinuous receive mode (long DRX mode) in a connected state or a common connected state. When the UE1 exits the current cell, the UE1 notifies the above-mentioned serving base station of withdrawing the resource allocated for the UE1 and used for broadcasting the information of the UE1.

Specifically, in this implementation, that the UE1 establishes the connection with the serving base station of the current cell of the above-mentioned UE1 may be as follows: the UE1 sends an Attach Request message to the above-mentioned serving base station, wherein the Attach Request message carries an IMSI or an old GUTI of the UE1, a last visited tracking area identifier (last visited TAI) of the UE1 (if any), a core network capability of the UE1, a packet data network type (Packet Data Network type, PDN type for short below), protocol configuration options, a ciphered options transfer flag, an attach type, a KSIASME (for identifying a root key, KASME), a non-access stratum sequence number (NAS sequence number), a non-access stratum media access control (NAS-MAC for short below) address, an additional GUTI, a packet temporary mobile subscriber identifier signature (P-TMSI signature) message and a radio resource control (RRC) parameter and specific DRX parameters of the UE1, and is added with a "D2D connection" type parameter.

Then the above-mentioned serving base station packages the Attach Request message sent by the above-mentioned UE1 to generate an initial UE message, and sends the initial UE message to a mobility management entity (MME); next, the MME packages an attach accept message to be sent to the UE1 into an S1_MME control message such as an initial context setup request message, and sends the initial context setup request message to the above-mentioned serving base station; and finally, the above-mentioned serving base station sends the initial context setup request message to the UE1, and the UE1 analyzes the initial context setup request message to acquire the above-mentioned Attach Accept message.

The above-mentioned Attach Accept message carries information such as an access point name (APN), a GUTI, a PDN Type, a packet data network address (PDN Address), a TAI list, an evolved packet system bearer identity (EPS Bearer Identity), a session management request, Protocol Configuration Options, a KSIASME, a NAS sequence number, NAS-MAC and the like. The above-mentioned Attach Accept message may also carry related information of a bearer for D2D connection in a profile of the UE1, and D2D bearer type information is added behind the EPS Bearer Identity, or a specific PDN is bound with the D2D connection. Further, the Attach Accept message may also include access stratum security context (Access Stratum security context, AS security context for short below) information, a handover restriction list, evolved packet system bearer quality of service (EPS Bearer QoS), an EPS Bearer Identity (alternatively, the EPS bearer includes a bearer for D2D connection), a tunnel endpoint identifier (TEID) for a serving gateway of a user plane and an address of the serving gateway, and aggregate maximum bit rate (AMBR) of the UE1.

Further, after the Attach Accept message is received, the UE1 sets the "GUTI" into a temp identity used in next update (TIN).

Alternatively, the above-mentioned added "D2D connection" type parameter may also be put in an S1 application protocol (S1-AP) message, such as an Initial Context Setup Request message, for transmitting an NAS Attach Accept message, and at the same time, indication information "supporting the D2D function" may be added to a UE radio capability information element of the Initial Context Setup Request message.

A format of the above-mentioned Attach Request message may be as shown in table 1, a format of the above-mentioned Initial UE Message may be as shown in table 2, a format of the above-mentioned Initial Context Setup Request message may be as shown in table 3, and a format of the above-mentioned Attach Accept message may be as shown in table 4.

TABLE 1

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach request message identity | Message type 9.8 | M | V | 1 |
| | EPS attach type | EPS attach type 9.9.3.11 | M | V | ½ |
| | DPS bearer indication | | O | | |
| | NAS key set identifier | NAS key set identifier 9.9.3.21 | M | V | ½ |
| | EPS mobile identity | EPS mobile identity 9.9.3.12 | M | LV | 5-12 |
| | UE network capability | UE network capability additional D2D capability | M | LV | 3-14 |
| | ESM message container | ESM message container 9.9.3.15 | M | LV-E | 5-n |
| 19 | Old P-TMSI signature | P-TMSI signature 10.5.5.8 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability | O | TLV | 4-10 |
| 13 | Old location area identification | Location area identification 9.9.2.2 | O | TV | 6 |

TABLE 1-continued

| IEI | Information Element | Type/Reference | Presence | Format | Length |
|---|---|---|---|---|---|
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting 9.9.3.44 | O | TLV | 3 |
| D- | Device properties | Device properties 9.9.2.0A | O | TV | 1 |
| E- | Old GUTI type | GUTI type 9.9.3.45 | O | TV | 1 |

TABLE 2

| Information Element (IE for short below)/Group Name | Presence | Range | IE type and reference | Semantics description | Criticality | Assigned Criticality |
|---|---|---|---|---|---|---|
| Message Type | M | | 9.2.1.1 | | YES | ignore |
| eNB UE S1AP ID | M | | 9.2.3.4 | | YES | reject |
| NAS-PDU | M | | 9.2.3.5 | ATTACH REQUEST message, see below | YES | reject |
| TAI | M | | 9.2.3.16 | | YES | reject |
| E-UTRAN CGI | M | | 9.2.1.38 | | YES | ignore |
| RRC Establishment cause | M | | 9.2.1.3a | | YES | Ignore |
| S-TMSI | O | | 9.2.3.6 | | YES | reject |
| GUMMEI | O | | 9.2.3.9 | | YES | reject |
| Cell Access Mode | O | | 9.2.1.74 | | YES | reject |
| GW Transport Layer Address | O | | Transport Layer Address 9.2.2.1 | Indicating GW Transport Layer Address if the GW is collocated with eNB | needed in the embodiment shown in FIG. 3 of the present disclosure | ignore |

TABLE 3

| Information Element (IE for short below)/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| eNB P-UE S1AP ID (new) | O | | 9.2.3.4 | If target (paired) UE in connected mode; This is for service request procedure, not attach accept procedure. | YES | reject |
| UE Aggregate Maximum Bit Rate | M | | 9.2.1.20 | | YES | reject |

TABLE 3-continued

| Information Element (IE for short below)/ Group Name | Presence | Range | IE type and reference | Semantics description | Criticality | Assigned Criticality |
|---|---|---|---|---|---|---|
| E-RAB to Be Setup List | | 1 | | | YES | reject |
| >E-RAB to Be Setup Item IEs | | | | | EACH | reject |
| >>E-RAB ID | M | | 9.2.1.2 | | — | |
| >> D2D-connection indication (new) | M | | 9.2.1.3a | | YES | Ignore |
| >>E-RAB Level QoS Parameters | M | | 9.2.1.15 | | — | |
| >>Transport Layer Address | M | | 9.2.2.1 | | — | |
| >>GTP-TEID | M | | 9.2.2.2 | | — | |
| >>NAS-PDU | O | | 9.2.3.5 | ATTACH ACCEPT, see below table | — | |
| >>Correlation ID | O | | 9.2.2.80 | | YES | ignore |
| UE Security Capabilities | M | | 9.2.1.40 | | YES | reject |
| Security Key | M | | 9.2.1.41 | | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | Alternatively, additional D2D capability | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | | YES | ignore |
| MME UE S1AP ID 2 | O | | 9.2.3.3 | | YES | ignore |

TABLE 4

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach accept message identity | Message type 9.8 | M | V | 1 |
| | EPS attach result | EPS attach result 9.9.3.10 | M | V | ½ |
| | Spare half octet | Spare half octet 9.9.2.9 | M | V | ½ |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |

TABLE 4-continued

| IEI | Information Element | Type/Reference | Presence | Format | Length |
|---|---|---|---|---|---|
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |

Step 202, the UE1 broadcasts the information of the UE1 on the acquired resource.

Specifically, the UE supporting the D2D function has the characteristics of discontinuous receive (DRX) and discontinuous transmission (DTX).

Therefore, in this embodiment, the mode that the UE1 broadcasts the information of the UE1 may be a DTX mode, and the information of the UE1 is broadcasted on the acquired resource in a DTX-Cycle.

Step 203, when UE2 supporting the D2D function knows the presence of the probably paired UE1 through a perceptive technology or search and measurement on other UE(s) supporting the D2D function, the UE2 sends an RRC connection establishment request message to the above-mentioned serving base station.

In this embodiment, before the step 203, the UE2 acquires a resource for broadcasting information of the UE2 likewise and broadcasts the information of the UE2 on the acquired resource, wherein the implementation is the same as the modes described in step 201 and step 202 and will not be repeated redundantly herein. A description is given in this embodiment, taking the same serving base station of the current cells of the UE2 and the UE1 as an example.

Alternatively, in this embodiment, a value of an establishment cause information element of the above-mentioned RRC connection establishment request message is a D2D connection; further, the above-mentioned RRC connection establishment request message may also carry an NAS ID (such as old GUTI or s-TMSI) and an AS ID of the UE1; or, alternatively, the above-mentioned RRC connection establishment request message may also carry a service code of the UE1. In this way, the above-mentioned serving base station may know that a D2D connection establishment process is initiated by the UE2 and may acquire an identifier of a destination UE or paired UE. In this embodiment, the above-mentioned destination UE or paired UE is UE1.

Specifically, the UE2 may search for information broadcasted by UE(s) supporting the D2D function except the UE2 on some specific resources by adopting a DRX mode in a DRX-Cycle, and the UE2 receives the UE1 information broadcasted by the UE1 after the presence of the probably paired UE1 is known. Or, the UE2 may also receive the UE1 information broadcasted by the UE1 in an event trigger mode; for example, when a user has some specific demands, a receive action is triggered through a human-machine interface; or a receive action is triggered by an application layer according to a demand profile previously customized by the user. Of course, the UE2 may also receive the UE1 information broadcasted by the UE1 in combination with the DRX mode and the event trigger mode.

Then, the UE2 discovers matching of the information of the UE1 and the demands of the UE2, and then the UE2 initiates establishment of a direct D2D connection with the UE1. Firstly, the UE2 sends the RRC connection establishment request message to the above-mentioned serving base station.

Step 204, the UE2 receives an RRC connection establishment response message sent by the above-mentioned serving base station.

Step 205, the UE2 sends an RRC connection establishment complete message to the above-mentioned serving base station.

In this embodiment, the above-mentioned RRC connection establishment complete message carries D2D capability information of the UE2 and service request signaling of the UE2, wherein the D2D capability information of the above-mentioned UE2 is used for indicating that the UE2 supports the D2D function. Further, the above-mentioned RRC connection establishment complete message may also carry an NAS ID (such as old GUTI or s-TMSI) and an AS ID of the UE1; or the above-mentioned RRC connection establishment complete message may also carry a service code of the UE1. In this way, the above-mentioned serving base station may know that the D2D connection establishment process is initiated by the UE2 and may acquire the identifier of the connected object (namely UE1).

In step 203-step 205, one or both of items that the RRC connection establishment complete message carries the D2D capability information of the UE2 and the value of the establishment cause information element of the RRC connection establishment request message is the D2D connection may occur. That is to say, if the value of the establishment cause information element of the RRC connection establishment request message is the D2D connection in step 203, the RRC connection establishment complete message may or may not carry the D2D capability information of the UE2 in step 205; or, if the value of the establishment cause information element of the RRC connection establishment request message is not the D2D connection in step 203, the RRC connection establishment complete message must carry the D2D capability information of the UE2 in step 205.

In addition, one or both of the above-mentioned RRC connection establishment complete message and the above-mentioned RRC connection establishment request message carry the NAS ID (such as old GUTI or s-TMSI) and the AS ID of the UE1; or, one or both of the above-mentioned RRC connection establishment complete message and the above-mentioned RRC connection establishment request message carry the service code of the UE1.

Step 206, the serving base station forwards the above-mentioned service request signaling to a mobility management entity (MME).

In this embodiment, alternatively, before the serving base station forwards the service request signaling of a non-access stratum to the MME, the serving base station may perform accept judgment control. Further, the above-mentioned serving base station may transmit measurement configuration of a link from the UE2 to the UE1 and/or a link from the UE2 to the serving base station to the UE2, and decides, according to a measurement result reported after the UE2 performs measurement according to the above-mentioned measurement configuration, whether a bearer and communication of D2D type are established.

In this embodiment, the above-mentioned serving base station packages the above-mentioned service request signaling into an Initial UE Message of an S1-AP port. Moreover, a "D2D connection" type is added to the Initial UE Message, so as to simplify a following paging process for D2D communication. Further, the Initial UE Message may include an NAS ID of the UE1, such as s-TMSI; and if the UE1 is in a connected state, the serving base station may map the AS ID of the UE1 into an eNB T-UE S1AP ID, and the eNB T-UE S1AP ID is carried in the Initial UE Message and sent to core network device, such as the MME.

A format of the above-mentioned Initial UE Message may be as shown in table 5.

Step 207, after receiving the above-mentioned service request signaling, the MME performs an authentication process.

If authentication is passed, the MME initiates a context setup process, so as to trigger a bearer establishment process.

Specifically, a packet data network gateway (PGW) may complete mapping from a DPS bearer to a radio bearer according to the current LTE technology. For example, the PGW completes bearer management functions such as allocation of the Internet protocol (IP) address of the DPS bearer, management of quality of service (QoS) and the like.

Step 208, the MME sends an initial context setup request message to the serving base station, to activate a radio bearer and an S1 bearer of all EPS bearers.

The above-mentioned initial context setup request message includes a serving gateway address, an uplink S1-TEID (S1-TEID(s)), EPS Bearer QoS(s), Security Context, an MME Signaling Connection ID and a Handover Restriction List. Moreover, a D2D connection indication information element is added to the above-mentioned Initial Context Setup Request message in this embodiment.

After the above-mentioned Initial Context Setup Request message is received, the above-mentioned serving base station saves the Security Context, the MME Signaling Connection Id, the EPS Bearer QoS(s) and S1-TEID(s) in a Radio Access Network context (RAN context) of the serving base station.

A format of the above-mentioned Initial Context Setup Request message may be as shown in table 6.

TABLE 5

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| eNB UE S1AP ID | M | | 9.2.3.4 | | YES | reject |
| eNB T-UE S1AP ID | O | | 9.2.3.4 | If the destination (paired) UE is in a connected state | YES | reject |
| NAS-PDU | M | | 9.2.3.5 | | YES | reject |
| TAI | M | | 9.2.3.16 | | YES | reject |
| E-UTRAN CGI | M | | 9.2.1.38 | | YES | ignore |
| RRC Establishment cause | M | | 9.2.1.3a | Adding "D2D connection" type | YES | Ignore |
| S-TMSI | O | | 9.2.3.6 | | YES | reject |
| S-TMSI | O | | 9.2.3.6 | If the destination (paired) UE is in a connected state or in an idle state | YES | reject |
| CSG Id | O | | 9.2.1.62 | | YES | reject |
| GUMMEI | O | | 9.2.3.9 | | YES | reject |
| Cell Access Mode | O | | 9.2.1.74 | | YES | reject |
| GW Transport Layer Address | O | | 9.2.2.1 | | YES | ignore |
| Relay Node Indicator | O | | 9.2.1.79 | Indicating a relay node | YES | reject |

TABLE 6

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| eNB T-UE S1AP ID | O | | 9.2.3.4 | If the destination (paired) UE is in a connected state; probably the IE is not necessary in the message | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | | | | EACH | reject |
| >>E-RAB ID | M | | 9.2.1.2 | | — | |
| >> D2D-connection findication | O | | 9.2.1.3a | | YES | Ignore |
| >>E-RAB Level QoS Parameters | M | | 9.2.1.15 | | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.2.80 | | YES | ignore |
| UE Security Capabilities | M | | 9.2.1.40 | | YES | reject |
| Security Key | M | | 9.2.1.41 | | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | | YES | ignore |
| MME UE S1AP ID 2 | O | | 9.2.3.3 | | YES | ignore |

Step 209, the serving base station executes mapping from a DPS bearer to a radio bearer.

One radio bearer is used for transmitting a data packet of one DPS bearer between two UEs. If one radio bearer exists, a one-to-one mapping relation exists between one DPS bearer and one radio bearer. Between two UEs, one DPS bearer uniquely identifies a traffic flow group with common QoS characteristics. A packet filter rule is associated with a unique packet filter identifier in each connection and is transmitted in signaling of a similar NAS process. One DPS bearer is a set of all packet filter rules in this bearer.

The traffic flow groups with a same QoS characteristics are mapped to a same DPS bearer. For example, the above-mentioned QoS characteristics may include a scheduling strategy, a queuing management strategy, a speed reshaping strategy, radio link control (RLC management and the like.

Step 210, the serving base station sends an initial context setup complete/response message to the MME.

Specifically, after the mapping from the DPS bearer to the radio bearer is completed, the serving base station sends an RRC reconfiguration request message to the UE2, and receives an RRC reconfiguration complete message sent by the UE2. After the serving base station receives the RRC reconfiguration complete message sent by the UE2, the mapping from the DPS bearer to the radio bearer is completed. Then, the serving base station sends a reply message to the MME, such as the initial context setup complete/response message, wherein the initial context setup complete/response message carries an address of the serving base station, an accepted EPS bearer list, a rejected EPS bearer list and TEID(s) (downlink) of an S1 port. Moreover, a "D2D connection" type indicator is added to "evolved universal terrestrial radio access network radio access bearer identity (E-RAB ID)" information in the "accepted EPS bearer list", or a dedicated PDN connection for management of the DPS bearer is stipulated in the Attach process.

In this embodiment, a format of the initial context setup complete/response message may be as shown in table 7.

TABLE 7

| Information Element (IE for short below)/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| E-RAB Setup List | | 1 | | | YES | ignore |
| >E-RAB Setup Item Ies | | 1 to <maxnoofE-RABs> | | | EACH | ignore |
| >>E-RAB ID | M | | 9.2.1.2 | 1: in the attach process, it has been bound with a D2D bearer; 2: attach a D2D communication type alternatively | — | |
| >> D2D-connection indication (new) | O | | | | | |
| >>Transport Layer Address | M | | 9.2.2.1 | | — | |
| >>GTP-TEID | M | | 9.2.2.2 | | — | |
| E-RAB Failed to Setup List | O | | E-RAB List 9.2.1.36 | a value for E-RAB ID shall only be present once in E-RAB Setup List IE + E-RAB Failed to Setup List IE | YES | ignore |
| Criticality Diagnostics | O | | 9.2.1.21 | | YES | ignore |

Step 211, the MME sends an update bearer request message to a gateway (GW).

Step 212, the MME receives an update bearer response message sent by the GW.

Step 213, the MME sends a first message to the above-mentioned serving base station.

In this embodiment, the above-mentioned first message is used for triggering the serving base station to send a message to the UE1, so that a connection is established between the UE1 and the network-side device. The above-mentioned first message may be a paging message or a new message, and the above-mentioned first message carries a "D2D connection" type, an identity of a UE (UE2 in this embodiment) for triggering current D2D communication and an identity of a UE (UE1 in this embodiment) needing connection establishment.

In this embodiment, after the MME receives the reply message of the above-mentioned serving base station, such as the initial context setup complete/response message, the MME sends the first message to the above-mentioned serving base station to trigger the serving base station to send a second message to the UE1, so that the connection is established between the UE1 and the network-side device.

Taking the above-mentioned first message which is the paging message as an example, a "D2D connection" type and an identifier of the UE for triggering the current D2D communication are added to the existing paging message sent from the MME to the serving base station in this embodiment. In this embodiment, the UE for triggering the current D2D communication is the UE2, and the identifier of the UE for triggering the current D2D communication herein is the one capable of being identified by the above-mentioned serving base station.

In this embodiment, a format of the paging message sent from the MME to the serving base station may be as shown in table 8.

be repeated redundantly herein. Alternatively, the UE1 performs accept control of this connection establishment process first.

Alternatively, a default bearer is established between the UE1 and the serving base station.

Alternatively, the serving base station may also directly send scheduling information to the UE1; and then, the scheduling information of the UE1 is updated according to feedback of the UE1 about measurement of a link of D2D connection.

TABLE 8

| Information Element (IE)/ Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| T-UE Paging Identity D2D Communication indication | O | | 9.2.3.13 | | | |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List | | 1 to <maxnoofTAIs> | | | EACH | ignore |
| >>TAI | M | | 9.2.3.16 | | — | |
| CSG Id List | | 0 . . . 1 | | | GLOBAL | ignore |
| >CSG Id | | 1 to <maxnoofCSGId> | 9.2.1.62 | | — | |
| Paging Priority | O | | 9.2.1.78 | | YES | ignore |

Step 214, the above-mentioned serving base station sends a second message to the UE1.

In this embodiment, the above-mentioned second message is used for triggering the UE1 to establish a connection with the network-side device. The above-mentioned second message may be a paging message or in a newly designed message format, and may carry a "D2D connection" type and an identity of a UE (UE2 in this embodiment) for triggering current D2D communication.

Taking the above-mentioned second message which is the paging message as an example, the "D2D connection" type indicator and the identifier of the UE for triggering the current D2D communication are added to the existing paging message sent from the serving base station to the UE in this embodiment. In this embodiment, the UE for triggering the current D2D communication is UE2, and the identifier of the UE for triggering the current D2D communication herein is the one capable of being identified by the above-mentioned serving base station. The above-mentioned "D2D connection" type indicator may be an explicit indicator or an implicit indicator according to an additional information element.

Step 215, the UE1 initiates a connection establishment process with the network-side device.

After the UE1 receives the second message sent by the above-mentioned serving base station, the UE1 initiates a connection establishment process with the network-side device. In this process, the process of establishing the DPS bearer of the UE1 by a network is similar to the process of establishing the DPS bearer of the UE2 by the network, and this process is described as step 207 to step 210 and will not Alternatively, the serving base station may pre-configure a resource of the UE1 from a longer time perspective, such as a semi-static resource used for sending/receiving of UE1. Specifically, the serving base station configures offset of the semi-static resource, cycle of the semi-static resource, the number of hybrid automatic repeat request (HARQ) processes of semi-static scheduling and a resource for sending acknowledgement (ACK)/negative-acknowledgement (NACK).

Step 216, the UE1 initiates connection establishment with the UE2. Alternatively, after the UE1 completes connection establishment with the serving base station, the UE1 initiates the connection establishment with the UE2.

Specifically, the UE1 sends a D2D link establishment request message to the UE2 first. The D2D link establishment request message carries: an identifier (D-RNTI or physical identifier of the UE1) of the UE 1 and an identifier (D-RNTI or physical identifier of the UE2) of the UE2; channel state information (CSI) of the UE1, such as a modulation and coding scheme (MCS), a code rate and/or precoding matrix indexes (PMI) and the like; and configuration information of resource allocation condition (if the serving base station does not transmit similar time division duplexing (TDD)) proportion.

Further, after the UE2 receives the above-mentioned D2D link establishment request message, access control is alternatively performed. If connection establishment is permitted, the UE2 replies a D2D link establishment response message to the UE1. The D2D link establishment response message carries the identifier (D-RNTI or physical identifier of the UE2) of the UE2, the identifier (D-RNTI or physical identifier of the UE1) of the UE 1, the CSI of the UE2 such as the MCS, the code rate, and/or PMIs and the like, and resource allocation accept or reject. The resource allocation accept or reject indicates that the UE2 accepts or rejects a resource allocation condition of the UE1, and alternatively carries a cause value or a recommended resource allocation mode.

Finally, after the UE1 receives the D2D link establishment response message sent by the UE2, the UE1 sends a D2D link establishment complete message to the UE2.

Step 217, establishment of the DPS bearer between the UE1 and the UE2 is completed. The UE1 and the UE2 start D2D communication.

In this embodiment, if the serving base station does not send dynamic scheduling information, the UE1 and the UE2 may perform scheduling consultation or automatic scheduling according to the condition of measurement of a link of D2D connection themselves, and update scheduling information of the opposite UE according to the measurement result later.

In the above-mentioned embodiment, the above-mentioned serving base station may be an evolved NodeB (eNB). Of course, the embodiments of the present disclosure are not limited to this, and the embodiments of the present disclosure do not limit the form of the base station.

The above-mentioned embodiment may realize establishment of the DPS bearer between the user equipments supporting the D2D function, realize communication between the user equipments supporting the D2D function and further realize resource controllability of the network.

Figure 3:
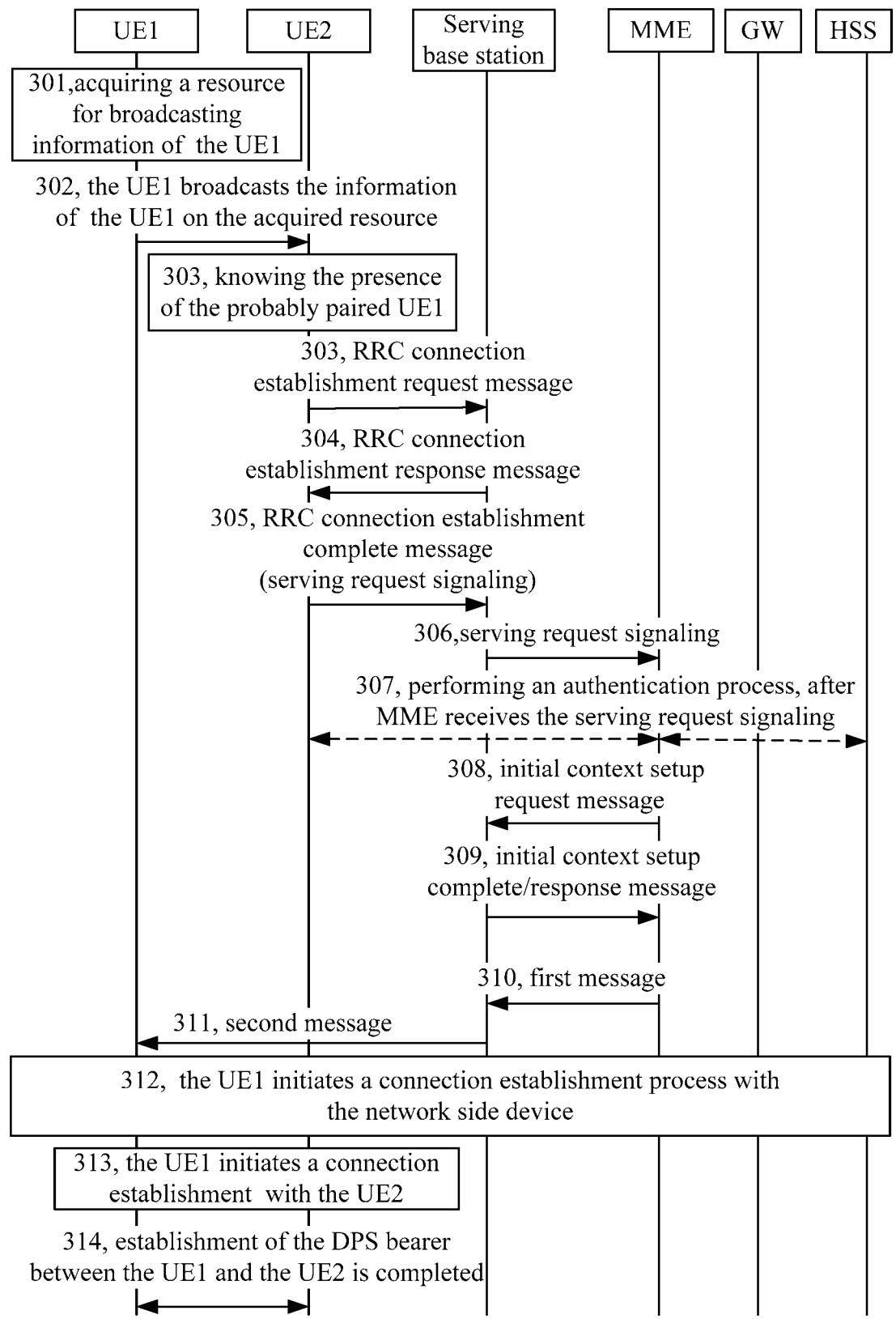
FIG. 3 is a flowchart of a further embodiment of the connection establishment method according to the present disclosure.

FIG. 3 is a flowchart of a further embodiment of the connection establishment method of the present disclosure. As shown in FIG. 3, the connection establishment method may include:

Step 301 to step 306, which are the same as step 201 to step 206.

Step 307, after the MME receives the above-mentioned service request signaling, the MME performs an authentication process.

If authentication is passed, the MME initiates a context setup process, so as to trigger a bearer establishment process.

Step 308, the MME sends a context setup request message to the serving base station, to trigger a bearer establishment process and a mapping process from a DPS bearer to a radio bearer.

In this embodiment, bearer management functions such as allocation of IP address, management of QoS of the DPS and the like may be completed by an entity with an internal gateway function. The above-mentioned entity with the internal gateway function may be an independent entity or be integrated together with the above-mentioned serving base station.

In this implementation, one DPS bearer has the following characteristic:

Each dedicated DPS bearer is associated with one TFT.

A TX traffic flow template (TX TFT) is a set of sent packet filter rules in one TFT. The UE2 filters a traffic flow in a sending direction to a corresponding DPS bearer by using the TX TFT, and the UE1 filters a traffic flow in a sending direction to a corresponding DPS bearer by using the TX TFT likewise. Meanwhile, the two UEs save the TX TFT of the opposite party as an RX traffic flow template (RX TFT), and determine a mapping relation between a received traffic flow and a corresponding DPS bearer according to the RX TFT. The RX TFT is acquired in a mode that the UE1 and the UE2 which support the D2D function inform each other or inform the opposite party through a network in the connection establishment process. In this way, the UE1 and the UE2 may determine association between Bearer(s) and Application(s) by using the TX TFT and RX TFT: determine which Application the data from the Bearer belong to according to the TFT, namely receive (RX); and determine which Bearer the data from the Application are mapped to according to the TFT, namely transmission (TX).

One radio bearer is used for transmitting a data packet of one DPS bearer between two UEs. If one radio bearer exists, a one-to-one mapping relation exists between one DPS bearer and one radio bearer. Between two UEs, one DPS bearer uniquely identifies a traffic flow group with common QoS characteristics. A packet filter rule is associated with a unique packet filter identifier in each connection and is transmitted in signaling of a similar NAS process. One DPS bearer is a set of all packet filter rules in this bearer.

The traffic flow groups with a same QoS characteristics are mapped to a same DPS bearer. For example, the above-mentioned QoS characteristics may include a scheduling strategy, a queuing management strategy, a speed reshaping strategy, RLC management and the like.

Figure 4A:
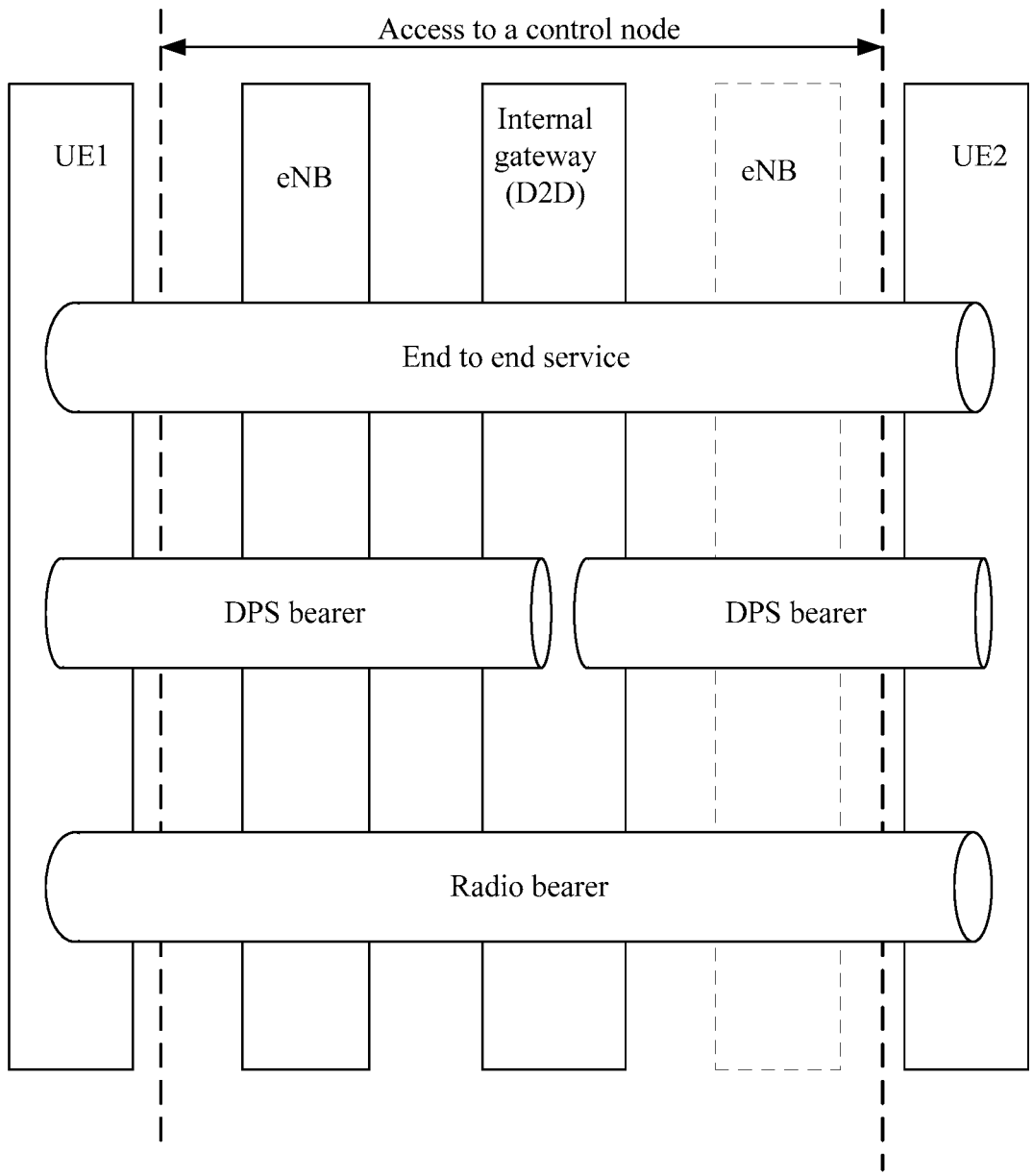
FIGS. 4a-4c are schematic diagrams of an embodiment of bearer mapping according to the present disclosure.
Figure 4B:
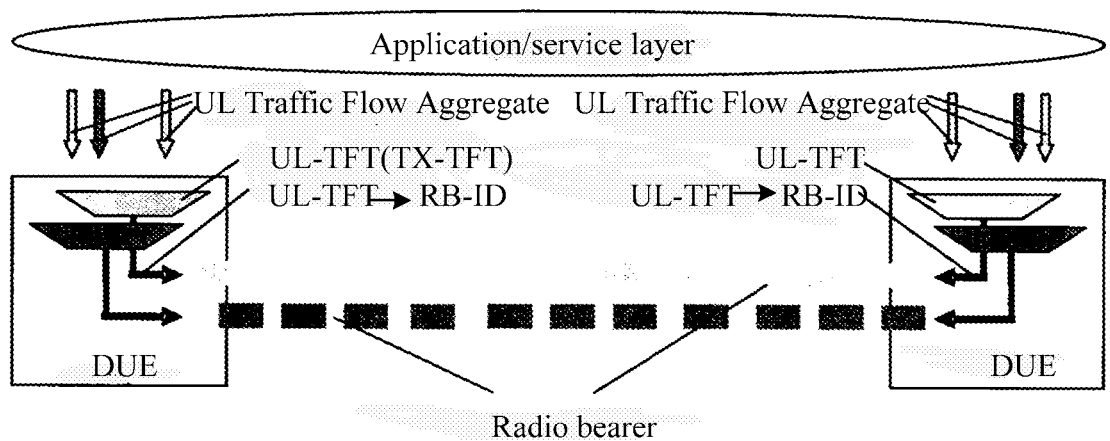
Figure 4C:
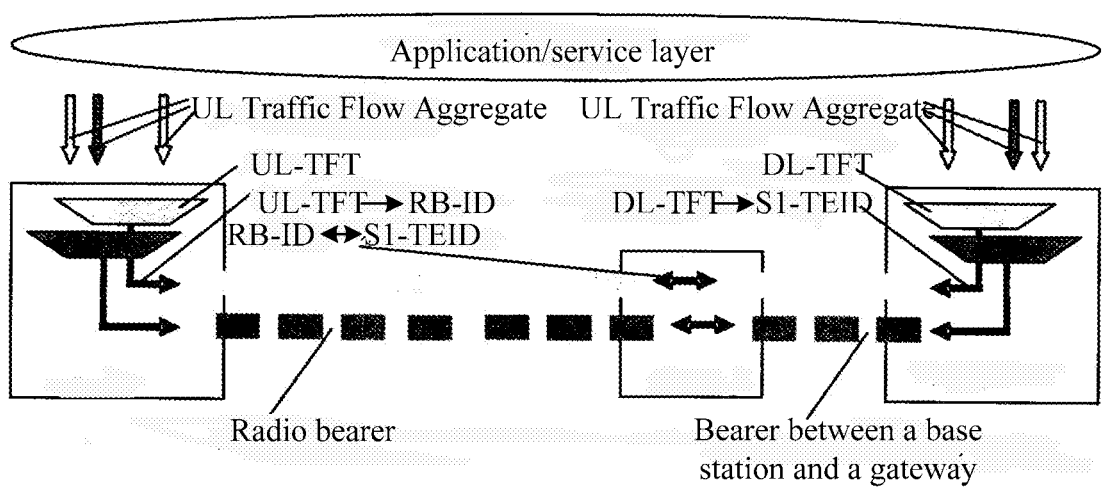

In this embodiment, diagrams of mapping from radio bearers to DPS bearers may be as shown in FIG. 4*a* to FIG. 4*c*, and FIG. 4*a* to FIG. 4*c* are schematic diagrams of an embodiment of bearer mapping of the present disclosure.

Step 309, the serving base station sends an initial context setup complete/response message to the MME.

Specifically, after mapping from the DPS bearer to the radio bearer is completed, the serving base station sends an RRC reconfiguration request message to the UE2, and receives an RRC reconfiguration complete message sent by the UE2. After the serving base station receives the RRC reconfiguration complete message sent by the UE2, the mapping from the DPS bearer to the radio bearer is completed. Then, the serving base station sends a reply message to the MME, such as the initial context setup complete/response message, wherein the initial context setup complete/response message carries an address of the serving base station, an accepted EPS bearer list, a rejected EPS bearer list and TEID(s) (downlink) of an S1 port. Moreover, a "D2D connection" type indicator is added to "E-RAB ID" information in the "accepted EPS bearer list", or a dedicated PDN connection for management of the DPS bearer is stipulated in the Attach process.

In this embodiment, a format of the initial context setup complete/response message may be as shown in table 7.

Step 310 to step 314 are the same as step 213 to step 217.

In this embodiment, if the serving base station does not send dynamic scheduling information, the UE1 and the UE2 may perform scheduling consultation or automatic scheduling according to the condition of measurement of a link of D2D connection themselves, and update scheduling information of the opposite UE according to the measurement result later.

In the above-mentioned embodiment, the above-mentioned serving base station may be an eNB. Of course, the embodiment of the present disclosure is not limited to this, and the embodiment of the present disclosure does not limit the form of the base station.

The above-mentioned embodiment may realize establishment of the DPS bearer between the user equipments supporting the D2D function, realize communication between the user equipments supporting the D2D function and further realize resource controllability of the network.

Figure 5A:
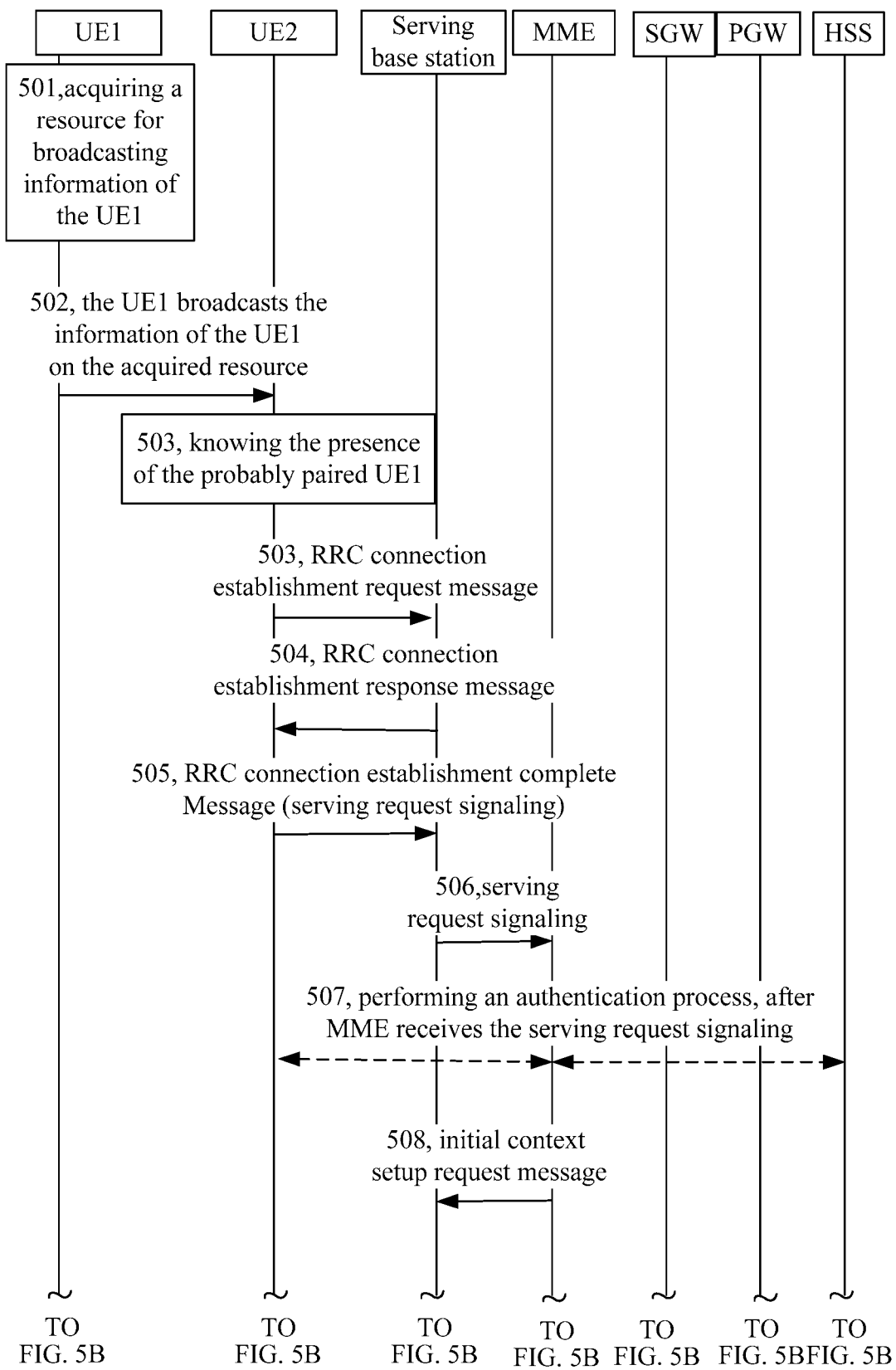
FIG. 5A and FIG. 5B are flowcharts of a still further embodiment of the connection establishment method according to the present disclosure.
Figure 5B:
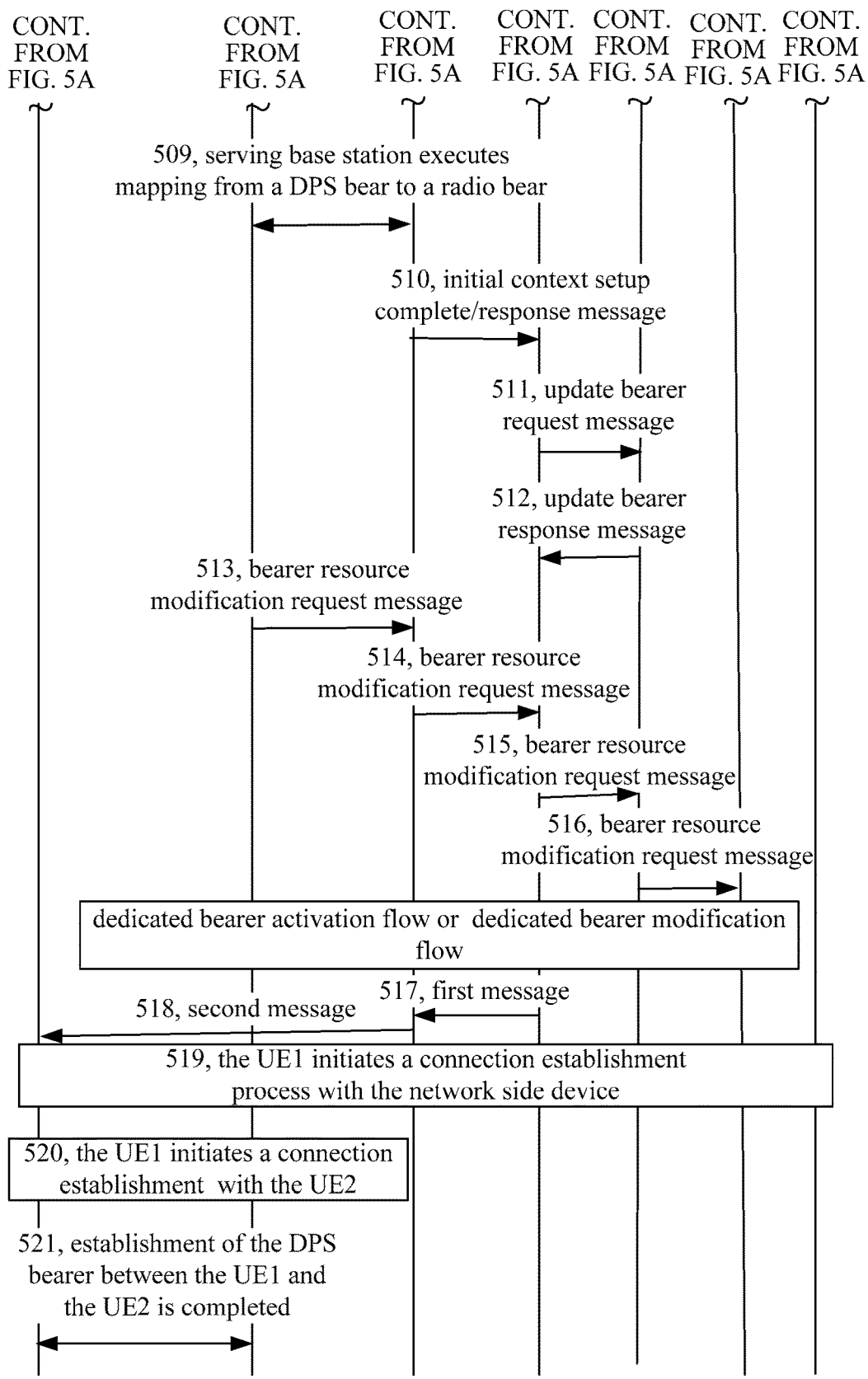

FIG. 5 is a flowchart of a still further embodiment of the connection establishment method of the present disclosure. In this embodiment, establishment of a DPS bearer still adopts the principle that management and resource allocation of the DPS bearer are performed by a PGW in LTE. In this embodiment, the initial state of UE1 and that of UE2 are idle states.

As shown in FIG. 5, the connection establishment method may include:

Step 501, UE1 supporting a D2D function acquires a resource for broadcasting information of the UE1, wherein the information of the UE1 includes one or a combination of an identifier, service information, a service code and application layer service information of the UE1.

Specifically, the mode that the UE1 acquires the resource for broadcasting the information of the UE1 is the same as the mode described in step 301 of the embodiment shown in FIG. 3 of the present disclosure, and will not be repeated redundantly herein.

Step 502, the UE1 broadcasts the information of the UE1 on the acquired resource.

Specifically, the mode that the UE1 broadcasts the information of the UE1 is the same as the mode described in step 302 of the embodiment shown in FIG. 3 of the present disclosure, and will not be repeated redundantly herein.

Step 503, when UE2 supporting the D2D function knows the presence of the probably paired UE1 through a perceptive technology or search and measurement aiming at other UE(s) supporting the D2D function, the UE2 sends an RRC connection establishment request message to a serving base station of a current cell of the UE1.

In this embodiment, before the step 503, the UE2 acquires a resource for broadcasting information of the UE2 likewise and broadcasts the information of the UE2 on the acquired resource, wherein the implementation is the same as the modes described in step 501 and step 502 and will not be repeated redundantly herein. A description is given in this embodiment, taking the same serving base station of the current cells of the UE2 and the UE1 as an example.

In this embodiment, a value of an establishment cause information element of the above-mentioned RRC connection establishment request message is a D2D connection. Further, the above-mentioned RRC connection establishment request message may also carry an NAS ID (such as old GUTI or s-TMSI) and an AS ID of the UE1; or, the above-mentioned RRC connection establishment request message may also carry a service code of the UE1. In this way, the above-mentioned serving base station may know that a D2D connection establishment process is initiated by the UE2 and may acquire the identifier of a destination UE or paired UE. In this embodiment, the above-mentioned destination UE or paired UE is UE1.

Specifically, the UE2 may search for information broadcasted by UE(s) supporting the D2D function except the UE2 on some specific resources by adopting a DRX mode in a DRX-Cycle, and the UE2 receives the UE1 information broadcasted by the UE1 after the presence of the probably paired UE1 is known. Or, the UE2 may also receive the UE1 information broadcasted by the UE1 in an event trigger mode. For example, when a user has some specific demands, a receive action is triggered through a human-machine interface; or a receive action is triggered by an application layer according to a demand profile previously customized by the user. Of course, the UE2 may also receive the UE1 information broadcasted by the UE1 in combination with the DRX mode and the event trigger mode.

Then, the UE2 discovers matching of the information of the UE1 and the demands of the UE2, and the UE2 initiates establishment of a direct D2D connection with the UE1.

Firstly, the UE2 sends the RRC connection establishment request message to the above-mentioned serving base station.

Step 504, the UE2 receives an RRC connection establishment response message sent by the above-mentioned serving base station.

Step 505, the UE2 sends an RRC connection establishment complete message to the above-mentioned serving base station.

In this embodiment, the above-mentioned RRC connection establishment complete message carries D2D capability information and service request signaling of the UE2. Further, the above-mentioned RRC connection establishment request message may also carry an NAS ID (such as old GUTI or s-TMSI) and an AS ID of the UE1; or the above-mentioned RRC connection establishment complete message may also carry a service code of the UE1. In this way, the above-mentioned serving base station may know that the D2D connection establishment process is initiated by the UE2 and may acquire the identifier of the connected object (namely UE1).

In step 503-step 505, one or both of items that the RRC connection establishment complete message carries the D2D capability information of the UE2 and the value of the establishment cause information element of the RRC connection establishment request message is the D2D connection may occur. That is to say, if the value of the establishment cause information element of the RRC connection establishment request message is the D2D connection in step 503, the RRC connection establishment complete message may or may not carry the D2D capability information of the UE2 in step 505; or, if the value of the establishment cause information element of the RRC connection establishment request message is not the D2D connection in step 503, the RRC connection establishment complete message must carry the D2D capability information of the UE2 in step 505.

In addition, one or both of the above-mentioned RRC connection establishment complete message and the above-mentioned RRC connection establishment request message carry the NAS ID (such as old GUTI or s-TMSI) and the AS ID of the UE1; or, one or both of the above-mentioned RRC connection establishment complete message and the above-mentioned RRC connection establishment request message carry the service code of the UE1.

Step 506, the serving base station forwards the above-mentioned service request signaling to an MME.

Step 507, after the MME receives the above-mentioned service request signaling, the MME performs an authentication process.

If authentication is passed, the MME initiates a context setup process, so as to trigger a bearer establishment process.

Step 508, the MME sends an initial context setup request message to the serving base station, to activate a radio bearer and an S1 bearer of all EPS bearers.

Specifically, for the format of the above-mentioned initial context setup request message, reference may be made to the description in step 208 of the embodiment shown in FIG. 2 of the present disclosure, which will not be repeated redundantly herein.

Step 509, the serving base station executes mapping from a DPS bearer to a radio bearer.

Specifically, the above-mentioned serving base station executes a radio bearer establishment process. The security function of a user plane is established in this step. After bearer establishment of the user plane is completed, the Service Request process is completed, and the DPS bearer is synchronized on the UE and the network side at the same time.

In this embodiment, configuration and management of the DPS bearer may be completed by a PGW or an MME in an EPC according to the existing LTE technology.

Step 510, the serving base station sends an initial context setup complete/response message to the MME.

Specifically, after mapping from the DPS bearer to the radio bearer is completed, the serving base station sends an RRC reconfiguration request message to the UE2, and receives an RRC reconfiguration complete message sent by the UE2. After the serving base station receives the RRC reconfiguration complete message sent by the UE2, the mapping from the DPS bearer to the radio bearer is completed. Then, the serving base station sends a reply message to the MME, such as the initial context setup complete/response message, wherein the initial context setup complete/response message carries the address of the serving base station, an accepted EPS bearer list, a rejected EPS bearer list and TEID(s) (downlink) of an S1 port. Moreover, a "D2D connection" type indicator is added to "E-RAB ID" information in the "accepted EPS bearer list", or a dedicated PDN connection for management of the DPS bearer is stipulated in the Attach process.

A format of the above-mentioned initial context setup complete/response message may be as shown in table 7, and will not be repeated redundantly herein.

Step 511, the MME sends an update bearer request message to a GW.

Step 512, the MME receives an update bearer response message sent by the GW.

Step 513, the UE2 sends a bearer resource modification request message to the above-mentioned serving base station.

In this embodiment, if no DPS bearer is established in an Attach process, the UE2 may initiate a request bearer resource modification process to trigger establishment of the DPS bearer.

Specifically, the UE2 may send the bearer resource modification request message to the above-mentioned serving base station first, wherein the bearer resource modification request message carries a linked EPS bearer ID (Linked EPS Bear ID, LBI for short below), a payload type indicator (Payload Type Indicator, PTI for short below), an EPS bearer identity, QoS, traffic aggregate description (Traffic Aggregate Description, TAD for short below) and protocol configuration options, and the bearer resource modification request message is added with a "D2D connection" type indicator, or has a dedicated packet data network (PDN) connection for management of the DPS bearer. The above-mentioned LBI is related with the D2D bearer, and the EPS bearer identity may also be used as the identity of the D2D bearer.

The above-mentioned TAD is used for indicating that the bearer resource modification request message adds, modifies or deletes packet filter rule(s). When a traffic flow is increased, the TAD includes a group of packet filter rules, but does not have a packet filter identifier. A UE (such as UE2) will also send QoS class identifier (QoS Class Identifier, QCI for short below) information and guaranteed bit rate (Guaranteed Bit Rate, GBR for short below) of the traffic flow to be increased. After this process is ended, the TAD is released.

Only when the UE (such as UE2) requests for a bearer adding operation, the UE sends the LBI to indicate which PDN connection is associated with an added bearer resource.

The EPS Bearer Identity is sent merely in the operations of modifying and deleting a bearer.

A format of the bearer resource modification request message sent by the UE may be as shown in table 9.

TABLE 9

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 1: in the attach process, it has been bound with a D2D bearer; 2: attach a D2D communication type | M | V | ½ |
|  | Procedure transaction identity | Procedure transaction identity 9.4 | M | V | 1 |
|  | Bearer resource modification request message identity | Message type 9.8 | M | V | 1 |
|  | EPS bearer identity for packet filter | Linked EPS bearer identity 1: add a "D2D connection" type indicator, 2: or have a dedicated PDN connection for management of the DPS bearer. | M | V | ½ |
|  | Spare half octet | Spare half octet 9.9.2.9 | M | V | ½ |
|  | Traffic flow aggregate | Traffic flow aggregate description 9.9.4.15 | M | LV | 2-256 |
| 5B | Required traffic flow QoS | EPS quality of service 9.9.4.3 | O | TLV | 3-11 |
| 58 | ESM cause | ESM cause 9.9.4.4 | O | TV | 2 |
| 27 | Protocol configuration options | Protocol configuration options 9.9.4.11 | O | TLV | 3-253 |
| C- | Device properties | Device properties 9.9.2.0A | O | TV | 1 |

Step 514, the above-mentioned serving base station sends a bearer resource modification request message to the MME.

The above-mentioned bearer resource modification request message carries an IMSI, a LBI, a PTI, an EPS Bearer Identity, QoS, TAD and Protocol Configuration Options. The MME verifies this request by using the LBI. For the EPS bearer(s) corresponding to the LBI, the MME uses the same SGW address. The bearer resource modification request message is added with a "D2D connection" type indicator, or has a dedicated PDN connection for management of the DPS bearer.

Step 515, the MME sends a bearer resource modification request message to a selected serving gateway (Serving Gateway), wherein the bearer resource modification request message carries an IMSI, a LBI, a PTI, an EPS Bearer Identity, QoS, TAD and Protocol Configuration Options. The MME verifies this request by using the LBI. For the EPS bearer(s) corresponding to the LBI, the MME uses the same SGW address. The bearer resource modification request message is added with a "D2D connection" type indicator, or has a dedicated PDN connection for management of the DPS bearer.

Step 516, the SGW sends a bearer resource modification request message to a PGW, wherein the bearer resource modification request message carries an IMSI, a LBI, a PTI, an EPS Bearer Identity, QoS, TAD and Protocol Configuration Options. The SGW sends the EPS bearer(s) corresponding to the LBI to the same PDN. The bearer resource modification request message is added with a "D2D connection" type indicator, or has a dedicated PDN connection for management of the DPS bearer.

If the above-mentioned bearer resource modification request message is accepted, a Dedicated Bearer Activation flow or a Dedicated Bearer Modification flow for management of the DPS bearer is initiated. The PTI allocated by the UE2 associates the Dedicated Bearer Activation flow initiated by the UE2 with the Bearer Resource Modification flow initiated by the UE2, and the PTI provides a necessary connection between a new traffic flow combination and an EPS bearer for the new traffic flow combination. When one new packet filter rule is added to one TFT, the PGW allocates a unique new packet filter identifier in this TFT. The PGW maintains a corresponding relation between the packet filter identifier(s) in a service data flow (SDF) and the packet filter identifier(s) in the TFT.

Step 517 to step 521 are the same as step 213 to step 217.

In the above-mentioned embodiment, the above-mentioned serving base station may be an eNB. Of course, the embodiment of the present disclosure is not limited to this, and the embodiment of the present disclosure does not limit the form of the base station.

The above-mentioned embodiment may realize establishment of the DPS bearer between the user equipments supporting the D2D function, realize communication between the user equipments supporting the D2D function and further realize resource controllability of the network.

Figure 6:
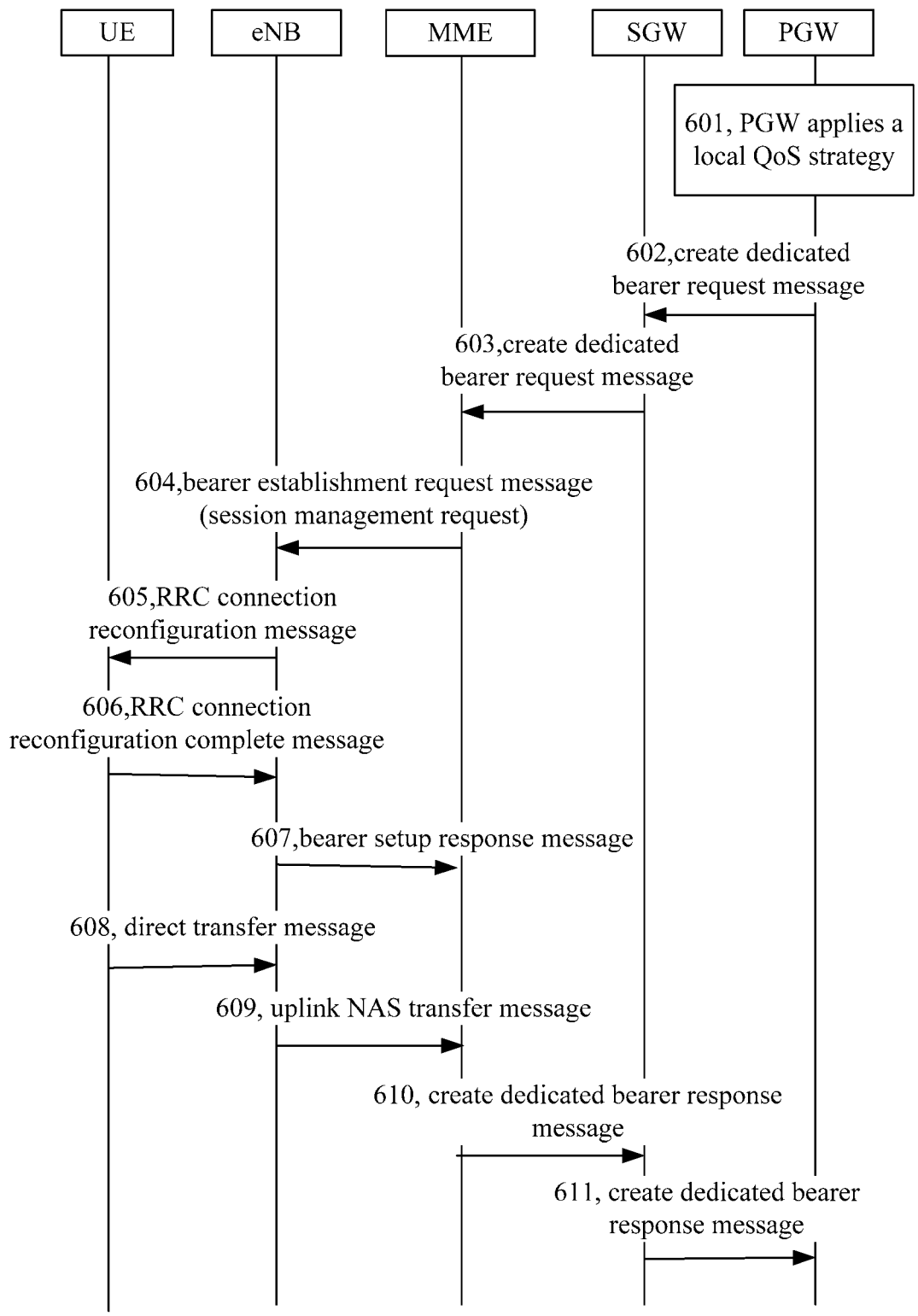
FIG. 6 is a flowchart of an embodiment of a dedicated bearer activation flow according to the present disclosure.

In the embodiment shown in FIG. 5 of the present disclosure, the dedicated bearer activation flow in step 515 may be as shown in FIG. 6, and FIG. 6 is a flowchart of an embodiment of a dedicated bearer activation flow of the present disclosure.

Step 601, a PGW applies a local QoS strategy.

Step 602, the PGW allocates EPS bearer QoS, such as a QoS parameter of an EPS bearer, by using the local QoS strategy, wherein the QoS parameter of the EPS bearer includes an QCI, address resolution protocol (ARP), GBR and maximum bit rate (MBR); and the PGW sends a create dedicated bearer request message to an SGW, wherein the create dedicated bearer request message includes an IMSI, a PTI, EPS Bearer QoS, a TFT, an S5/S8 tunnel endpoint identifier (S5/S8 TEID for short below), a LBI and protocol configuration options.

Step 603, the SGW sends a create dedicated bearer request message to the MME, wherein the create dedicated bearer request message includes an IMSI, a PTI, EPS Bearer QoS, a TFT, an S1-TEID, a LBI and protocol configuration options.

The LBI is added with a "D2D connection" type indicator, or has a dedicated PDN connection for management of the DPS bearer.

Step 604, the MME selects one EPS Bearer ID, and constructs a session management request, wherein the session management request includes a PTI, an TFT, an EPS Bearer QoS parameter, Protocol Configuration Options, an EPS Bearer Identity (alternatively, added "D2D connection" type indicator) and a LBI; and the MME sends a bearer setup request message to an eNB, wherein the bearer setup request message includes an EPS Bearer Identity, EPS Bearer QoS, Session Management Request and S1-TEID.

Step 605, the eNB maps the EPS Bearer QoS to QoS of a radio bearer, and sends an RRC connection reconfiguration message to the UE, wherein the RRC connection reconfiguration message includes Radio Bearer QoS, Session Management Request and an EPS Bearer Identity.

The UE in this embodiment may be UE2 or UE1.

After the above-mentioned RRC connection reconfiguration message is received, the UE NAS saves the EPS Bearer Identity and an association relation, which is established through the LBI, between a dedicated bearer and a default bearer. The UE decides mapping from the traffic flow to the radio bearer by using a TX TFT (UL TFT).

Step 606, the UE sends an RRC connection reconfiguration complete message to the eNB to respond to radio bearer activation.

Step 607, the eNB sends a bearer setup response message to the MME to acknowledge the bearer activation.

The above-mentioned bearer setup response message carries an EPS Bearer Identity and an S1-TEID.

Step 608, a UE NAS layer generates a session management response, and sends the above-mentioned session management response to the eNB through a direct transfer message.

The above-mentioned direct transfer message includes the EPS Bearer Identity.

Step 609, the eNB sends an uplink NAS transport message to the MME.

The above-mentioned uplink NAS transport message carries the session management response.

In this embodiment, a format of the above-mentioned Uplink NAS Transport message may be as shown in table 10.

TABLE 10

| Information Element (IE for short below)/ Group Name | Presence | Range | IE type and reference | Semantics description | Criticality | Assigned Criticality |
| --- | --- | --- | --- | --- | --- | --- |
| Message Type | M | | 9.2.1.1 | | YES | ignore |
| MME UE S1AP ID | M | | 9.2.3.3 | | YES | reject |

TABLE 10-continued

| Information Element (IE for short below)/ Group Name | Presence | Range | IE type and reference | Semantics description | Criticality | Assigned Criticality |
|---|---|---|---|---|---|---|
| MME T-UE S1AP ID(new) | O | | 9.2.3.3 | If target(paired) UE in connected mode | YES | reject |
| eNB UE S1AP ID | M | | 9.2.3.4 | | YES | reject |
| eNB T-UE S1AP ID (new) | O | | 9.2.3.4 | If target(paired) UE in connected mode | YES | reject |
| NAS-PDU | M | | 9.2.3.5 | Request Bearer Resource Modification alternative | YES | reject |
| D2D-connection indication (new) | O | | | | | |
| E-UTRAN CGI | M | | 9.2.1.38 | | YES | ignore |
| TAI | M | | 9.2.3.16 | | YES | ignore |
| GW Transport Layer Address | O | | Transport Layer Address 9.2.2.1 | Indicating GW Transport Layer Address if the GW is collocated with eNB | YES | ignore |

Step 610, after the bearer setup response message in step 607 and the session management response in step 609 are received, the MME sends a create dedicated bearer response message to the SGW to acknowledge that the bearer activation succeeds.

The above-mentioned create dedicated bearer response message carries the EPS Bearer Identity and the S1-TEID.

Step 611, the SGW sends a create dedicated bearer response message to the PGW.

Figure 7:
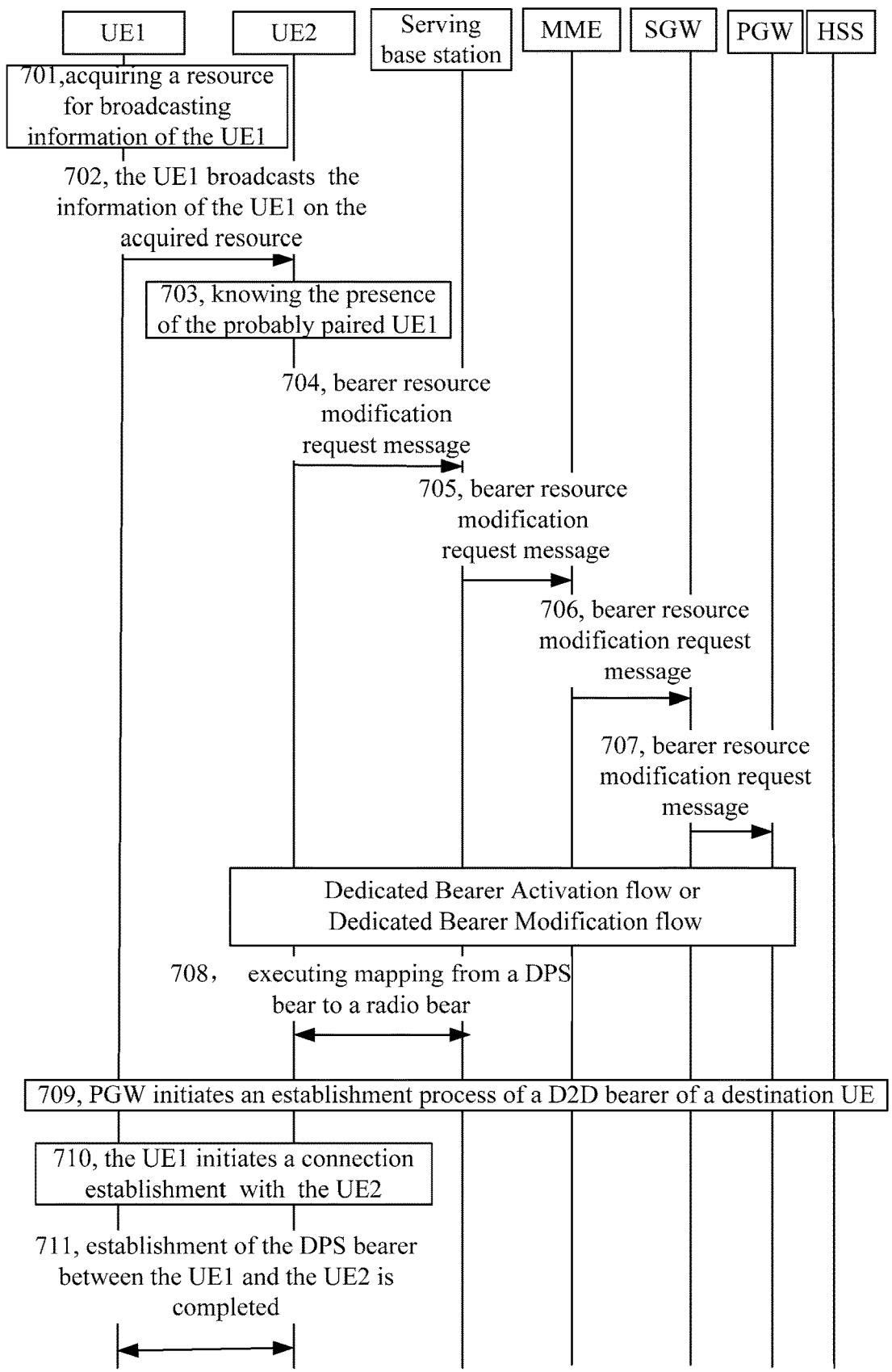
FIG. 7 is a flowchart of a still further embodiment of the connection establishment method according to the present disclosure.

FIG. 7 is a flowchart of a still further embodiment of the connection establishment method of the present disclosure. In this embodiment, establishment of a DPS bearer still adopts the principle that management and resource allocation of the DPS bearer are performed by a PGW in LTE. In this embodiment, the initial states of UE1 and UE2 are Active states.

Step 701, UE1 supporting a D2D function acquires a resource for broadcasting information of the UE1, wherein the information of the UE1 includes one or a combination of an identifier, service information, a service code and application layer service information of the UE1.

Specifically, the mode that the UE1 acquires the resource for broadcasting the information of the UE1 is the same as the mode described in step 201 of the embodiment shown in FIG. 2 of the present disclosure, and will not be repeated redundantly herein.

Step 702, the UE1 broadcasts the information of the UE1 on the acquired resource.

Specifically, the mode that the UE1 broadcasts the information of the UE1 is the same as the mode described in step 202 of the embodiment shown in FIG. 2 of the present disclosure, and will not be repeated redundantly herein.

Step 703, UE2 supporting the D2D function knows the presence of the probably paired UE1 through a perceptive technology or search and measurement on other UE(s) supporting the D2D function.

Alternatively, the UE2 sends an approach indicator to a serving base station, which carries the information of the UE1.

In this embodiment, before the step 703, the UE2 acquires a resource for broadcasting information of the UE2 likewise and broadcasts the information of the UE2 on the acquired resource, and the implementation is the same as the modes described in step 701 and step 702 and will not be repeated redundantly herein. A description is given in this embodiment, taking the same serving base station of the current cells of the UE2 and the UE1 as an example.

Step 704, the UE2 sends a bearer resource modification request message to the serving base station of the current cell of the UE1.

In this embodiment, if no D2D bearer is established in an Attach process, the UE2 may initiate a request bearer resource modification process to trigger establishment of the D2D bearer.

Specifically, the UE2 may send the bearer resource modification request message to the above-mentioned serving base station first, wherein the bearer resource modification request message carries a LBI, a PTI, an EPS Bearer Identity, QoS, TAD and protocol configuration options; and the bearer resource modification request message is added with a "D2D connection" type indicator, or has a dedicated PDN connection for management of the DPS bearer. The above-mentioned LBI is related with the D2D bearer, and the EPS Bearer Identity may also be used as the identity of the D2D bearer.

The above-mentioned TAD is used for indicating that the bearer resource modification request message adds, modifies or deletes packet filter rule(s). When a traffic flow is increased, the TAD includes a group of packet filter rules, but does not have a packet filter identifier. The UE (such as UE2) will also send QCI information and GBR of the traffic flow to be increased. After this process is ended, the TAD is released.

Only when the UE (such as UE2) requests for a bearer adding operation, the UE sends the LBI to indicate which PDN connection is associated with the added bearer resource(s).

The EPS Bearer Identity is sent merely in the operations of modifying and deleting the bearer.

A format of the bearer resource modification request message sent by the UE may be as shown in table 9.

Step 705, the above-mentioned serving base station sends a bearer resource modification request message to the MME.

The above-mentioned bearer resource modification request message carries an IMSI, a LBI, a PTI, an EPS Bearer Identity, QoS, TAD and Protocol Configuration Options. The MME verifies this request by using the LBI. For the EPS bearer(s) corresponding to the LBI, the MME uses a same SGW address. The bearer resource modification request message is added with a "D2D connection" type indicator, or has a dedicated PDN connection for management of the DPS bearer.

Step 706, the MME sends a bearer resource modification request message to a selected SGW, wherein the bearer resource modification request message carries an IMSI, a LBI, a PTI, an EPS Bearer Identity, QoS, TAD and Protocol Configuration Options. The MME verifies this request by using the LBI. For the EPS bearer(s) corresponding to the LBI, the MME uses a same SGW address. The bearer resource modification request message is added with a "D2D connection" type indicator, or has a dedicated PDN connection for management of the DPS bearer.

Step 707, the SGW sends a bearer resource modification request message to a PGW, wherein the bearer resource modification request message carries an IMSI, a LBI, a PTI, an EPS Bearer Identity, QoS, TAD and Protocol Configuration Options. The SGW sends the EPS bearer(s) corresponding to the LBI to a same PDN. The bearer resource modification request message is added with a "D2D connection" type indicator, or has a dedicated PDN connection for management of the DPS bearer.

If the above-mentioned bearer resource modification request message is accepted, a Dedicated Bearer Activation flow or a Dedicated Bearer Modification flow for management of the DPS bearer is initiated. The PTI allocated by the UE2 associates the Dedicated Bearer Activation flow initiated by the UE2 with the Bearer Resource Modification flow initiated by the UE2, and the PTI provides a necessary connection between a new traffic flow combination and an EPS bearer for the new traffic flow combination. When one new packet filter rule is added to one TFT, the PGW allocates a unique new packet filter identifier in this TFT. The PGW maintains a corresponding relation between the packet filter identifier(s) in an SDF and the packet filter identifier(s) in the TFT.

The above-mentioned dedicated bearer activation flow may be as shown in FIG. 6, and will not be repeated redundantly herein.

Step 708, the serving base station executes mapping from the DPS bearer to a radio bearer according to the information of the DPS bearer.

Specifically, the above-mentioned serving base station executes a radio bearer establishment process. The security function of a user plane is established in this step. After bearer establishment of the user plane is completed, the Service Request process is completed, and the DPS bearer is synchronized on the UE and the network side at the same time.

In this embodiment, configuration and management of the DPS bearer may be completed by a PGW or an MME in an EPC according to the existing LTE technology.

Step 709, the PGW initiates an establishment process of a D2D bearer of a destination UE.

In this embodiment, the above-mentioned destination UE is UE1.

Firstly, the PGW initiates a dedicated bearer activation flow to the UE1 according to the identifier of the UE1 acquired from the MME. The above-mentioned dedicated bearer activation flow may be as shown in FIG. 6, and will not be repeated redundantly herein.

Then, the above-mentioned serving base station executes mapping from the DPS bearer to the radio bearer.

In this embodiment, configuration and management of the DPS bearer may be completed by the PGW or the MME in the EPC according to the existing LTE technology.

Step 710, the UE1 initiates connection establishment with the UE2.

This step is an alternative step. Specifically, for the process that the UE1 initiates the connection establishment with the UE2, reference may be made to the description in step 216 of the embodiment shown in FIG. 2 of the present disclosure, which will not be repeated redundantly herein.

Step 711, establishment of the DPS bearer between the UE1 and the UE2 is completed. The UE1 and the UE2 start D2D communication.

The above-mentioned embodiment may realize establishment of the DPS bearer between the user equipments supporting the D2D function, realize communication between the user equipments supporting the D2D function and further realize resource controllability of the network.

In the embodiments shown in FIG. 2 to FIG. 7, the protocol stack of an air interface (namely a Ud port) between the UE1 and the UE2, merely has a user plane protocol stack, and does not have a control plane protocol stack or a simplified control plane protocol stack.

Figure 10A:
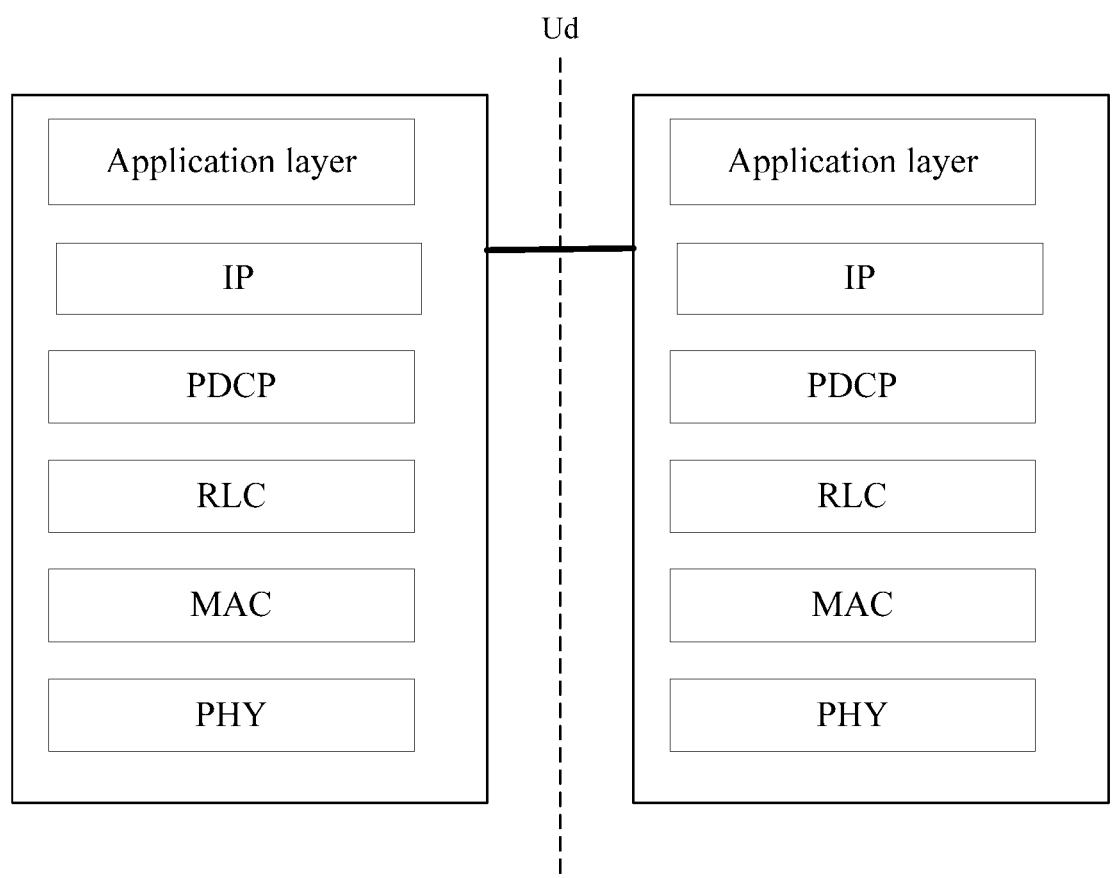
FIGS. 10a-10b are schematic diagrams of a user plane protocol stack according to the present disclosure.
Figure 10B:
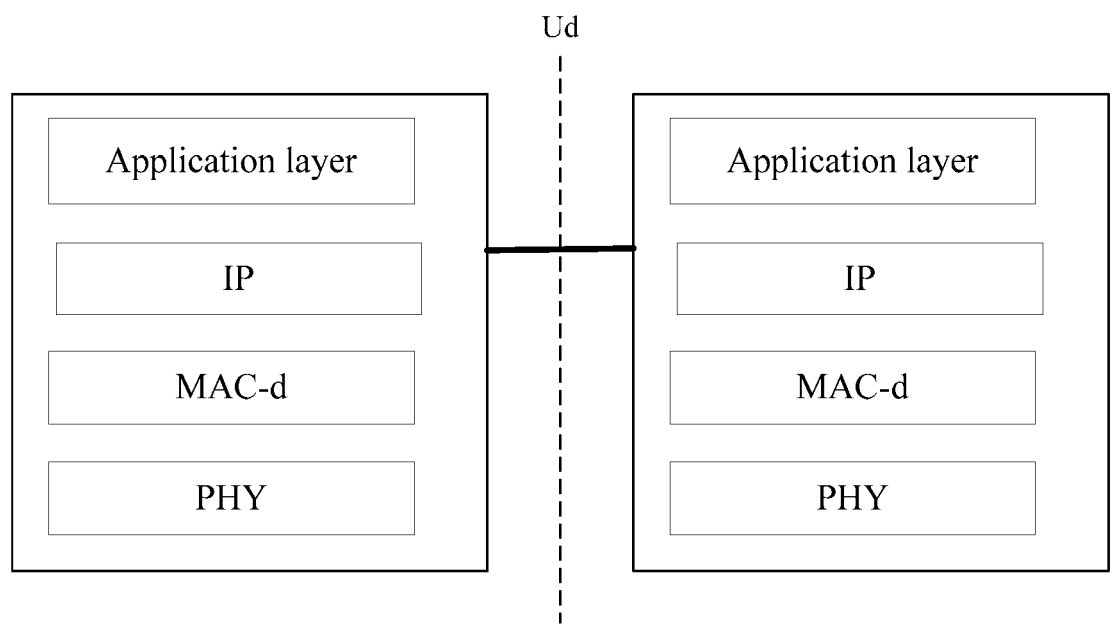

The user plane protocol stack of the above-mentioned Ud port may still adopt the protocol stack of the current LTE, as shown in FIG. 10*a*, and at this moment, the above-mentioned user plane protocol stack may be configured with information of one or a combination of IP, PDCP, RLC, MAC and PHY; or the user plane protocol stack of the above-mentioned Ud port may be the simplified protocol stack, as shown in FIG. 10*b*, and at this moment, the above-mentioned user plane protocol stack may be configured with information of one or a combination of IP, MAC-d and PHY. FIG. 10*a* to FIG. 10*b* are schematic diagrams of the user plane protocol stack of the present disclosure.

In the embodiments shown in FIG. 2 to FIG. 7 of the present disclosure, configuration of a Ud link is controlled by a network side, namely that the Ud port is configured and controlled through signaling of the Uu port, including establishment of the DPS bearer between the UE1 and the UE2 and mapping from the DPS bearer to the radio bearer.

Alternatively, if a resource is shared, the user plane protocol stack of the above-mentioned Ud port may also be configured with one or a combination of configuration information of similar TDD proportion(s) (not limited to several proportions stipulated in the current LTE), security information (encryption, integrity protection parameter and algorithm) and measurement configuration information. The measurement configuration information may include one or a combination of radio resource management (Radio Link Management, RRM for short below), radio link management (Radio Link Management, RLM for short below) and CSI. According to different pieces of reference signaling, configuration of the above-mentioned measurement configuration information is different. For example, if an uplink resource is shared, the eNB may configure the above-mentioned measurement configuration information by using a sounding reference signal (Sounding Reference Signal, SRS for short below) or a new reference signal (New Reference Signal, NRS for short below) as a measurement object; and if a downlink resource is shared, the eNB may configure the above-mentioned measurement configuration information by using cell-specific reference signals (Cell-specific Reference Signals, CRS for short below) or an NRS as a measurement object.

According to the user plane protocol stack of the above-mentioned Ud port, the eNB may send resource scheduling information, and the resource scheduling information includes one or a combination of a physical resource of a PHY layer, a modulation and coding scheme (MCS), a code rate and precoding matrix indexes (PMI) informed to be used by the UE1 and/or the UE2 and the like.

It should be appreciated by those of ordinary skill in the art that all or a part of the steps in the embodiments of the above-mentioned method may be implemented by a hardware related with program instructions. The program may be stored in a computer readable storage medium. When the program is executed, the steps of the embodiments of the above-mentioned method may be executed. The storage medium includes various media capable of storing program codes, such as a read-only memory (ROM), a random access memory (RAM), a magnetic disk, an optical disk or the like.

Figure 8:
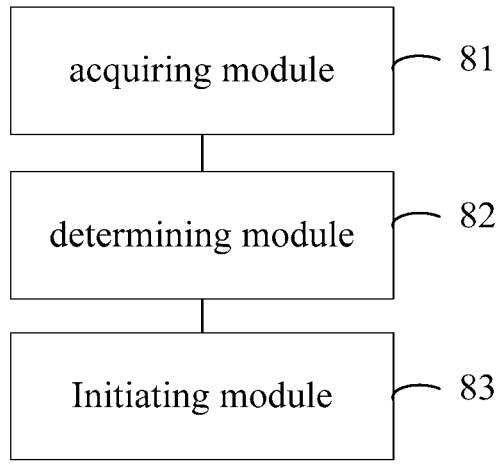
FIG. 8 is a structure schematic diagram of an embodiment of a user equipment according to the present disclosure.

FIG. 8 is a structure schematic diagram of an embodiment of a user equipment of the present disclosure. The user equipment in this embodiment is a second user equipment supporting a D2D function, and can implement the flow of the embodiment shown in FIG. 1 of the present disclosure. As shown in FIG. 8, the user equipment may include an acquiring module 81, a determining module 82 and an initiating module 83;

the acquiring module 81 is configured to acquire first user equipment information broadcasted by a first user equipment supporting a D2D function;

the determining module 82 is configured to determine that a connection with the first user equipment is established according to the first user equipment information acquired by the acquiring module 81;

the initiating module 83 is configured to initiate a connection establishment process with a network-side device and to send the first user equipment information to the network-side device in the connection establishment process, so that a connection is established between the network-side device and the first user equipment.

The above-mentioned user equipment may realize establishment of a DPS bearer between the user equipments supporting the D2D function, realize communication between the user equipments supporting the D2D function and further realize resource controllability of a network.

Figure 9:
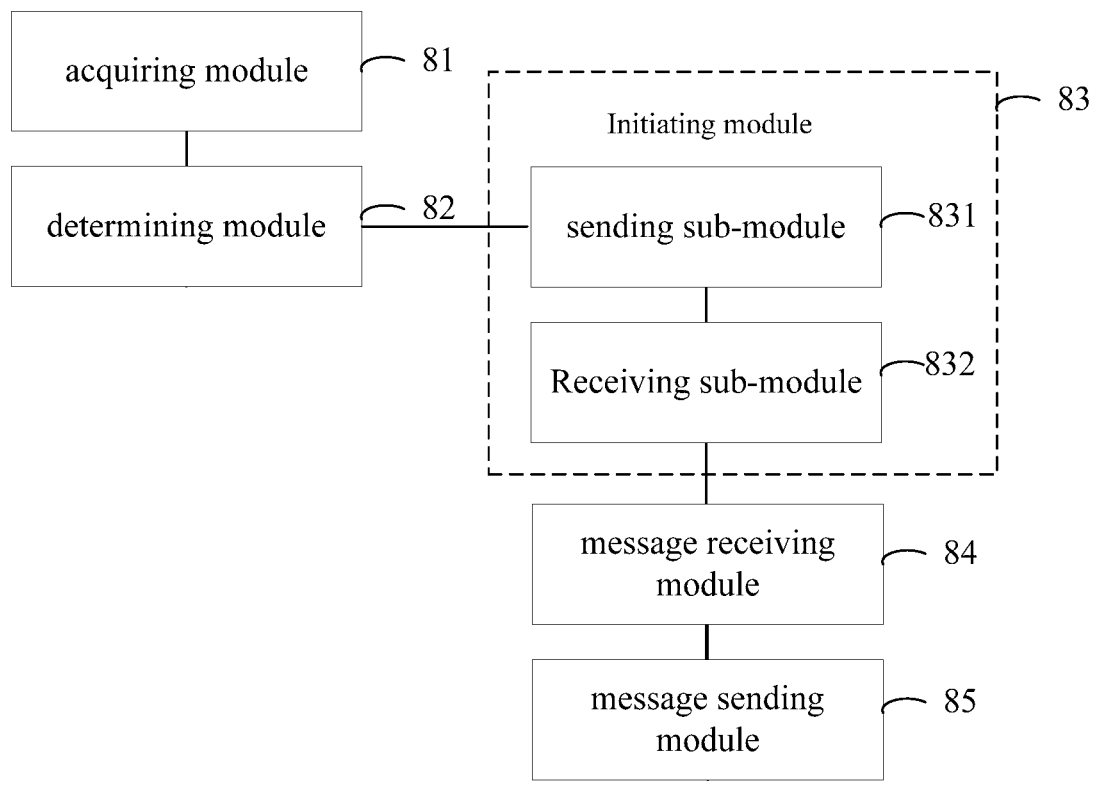
FIG. 9 is a structure schematic diagram of another embodiment of the user equipment according to the present disclosure.

FIG. 9 is a structure schematic diagram of another embodiment of the user equipment of the present disclosure. Compared with the user equipment shown in FIG. 8, what is the difference is, in the user equipment shown in FIG. 9, the initiating module 83 may include a sending sub-module 831 and a receiving sub-module 832;

the sending sub-module 831 is configured to send a radio resource control connection establishment request message to a serving base station of a current cell of second user equipment and send a radio resource control connection establishment complete message to the above-mentioned serving base station after the receiving sub-module 832 receives a radio resource control connection establishment response message sent by the above-mentioned serving base station, wherein the above-mentioned radio resource control connection establishment complete message carries non-access stratum signaling of the second user equipment, such as service request signaling;

the receiving sub-module 832 is configured to receive the radio resource control connection establishment response message sent by the above-mentioned serving base station;

wherein, a value of an establishment cause information element of the above-mentioned radio resource control connection establishment request message is a D2D connection; and/or, the above-mentioned radio resource control connection establishment complete message carries D2D capability information of the second user equipment, and the D2D capability information of the second user equipment is used for indicating that the second user equipment supports the D2D function;

one or both of the above-mentioned radio resource control connection establishment request message and the above-mentioned radio resource control connection establishment complete message carry a non-access stratum identifier and an access stratum identifier of the first user equipment;

one or both of the above-mentioned radio resource control connection establishment request message and the above-mentioned radio resource control connection establishment complete message carry a service code of the first user equipment.

Further, in this embodiment, the initiating module 83 may also initiate a request bearer resource modification flow to trigger establishment of the above-mentioned DPS bearer, when no DPS bearer is established between the second user equipment and the serving base station in an attach process.

Specifically, the initiating module 83 may send a bearer resource modification request message to a mobility management entity, so that the mobility management entity sends the bearer resource modification request message to a gateway;

the above-mentioned bearer resource modification request message carries a linked bearer identity and an evolved packet system bearer identity related with the above-mentioned DPS bearer, and the above-mentioned bearer resource modification request message is added with a D2D connection type indicator or has a dedicated packet data network connection for management of the DPS bearer.

Further, the user equipment in this embodiment may also include a message receiving module 84 and a message sending module 85;

wherein, the message receiving module 84 is configured to receive a D2D link establishment request message sent by the first user equipment; wherein the D2D link establishment request message carries an identifier of the first user equipment, an identifier of the second user equipment and channel state information and resource allocation condition of the first user equipment, and receive a D2D link establishment complete message sent after the first user equipment receives a D2D link establishment response message sent by the message sending module 85;

the message sending module 85 is configured to send a D2D link establishment response message to the first user equipment after the message receiving module 84 receives the D2D link establishment request message and if connection establishment is permitted, wherein the D2D link establishment response message carries the identifier of the second user equipment, the identifier of the first user equipment, channel state information of the second user equipment and an accepting or rejecting response of the second user equipment to the resource allocation condition of the first user equipment.

The above-mentioned user equipment may realize establishment of the DPS bearer with a user equipment supporting the D2D function, realize communication with the user equipment supporting the D2D function and further realize resource controllability of a network.

It should be understood by those skilled in the art that, each accompanying drawing is merely a schematic diagram of one preferred embodiment, and modules or flows in the accompanying drawings are not definitely necessary for implementing the present disclosure.

It should be understood by those skilled in the art that, modules in the device of the embodiments may be distributed in the device of the embodiments according to the description of the embodiments or located in one or more devices different from these embodiments through corresponding variation. The modules of the above-mentioned embodiments may be combined into one module or further split into multiple sub-modules.

In the end, it should be noted that the preceding embodiments are only used to illustrate the technical solutions of the present disclosure rather than limiting the present disclosure; though the present disclosure is illustrated in detail by referring to the preceding embodiments, it should be understood by those of ordinary skill in the art that modifications may still be made on the technical solutions recorded in the preceding respective embodiments, or equivalent alterations may be made to a part of technical characteristics thereof; and these modifications or alterations do not make the nature of corresponding technical solutions depart from the scope of the technical solutions of the respective embodiments of the present disclosure.

What is claimed is:

1. A method, comprising:
sending, by a first user equipment (UE), an attach request message to a base station for triggering the base station to allocate a resource for broadcasting information of the first UE, wherein the attach request message triggers the base station to send an initial UE message that includes the attach request message in a non-access-stratum protocol data unit (NAS-PDU) information element of the initial UE message to a mobility management entity, the attach request message comprises a device-to-device (D2D) capability of the first UE and an indication for a bearer for a D2D connection, the initial UE message indicates the mobility management entity to send an initial context setup request message that includes an attach accept message in a NAS-PDU information element of the initial context setup request message to the base station, and the initial context setup request message indicates that a D2D function is supported in a UE radio capability information element of the initial context setup request message;
in response to sending the attach request message, receiving, by the first UE from the base station, information about the resource for broadcasting the information of the first UE; and
broadcasting, by the first UE, the information of the first UE on the resource for establishing the D2D connection with a second UE, wherein the information of the first UE comprises an identifier of the first UE and a service code of the first UE, and the service code of the first UE indicates application layer service information.

2. The method of claim 1, wherein a protocol stack of an air interface between the first UE and the second UE comprises a user plane protocol stack, wherein the user plane protocol stack comprises at least one of internet protocol, media access control-d (MAC-d) information, and physical layer information.

3. The method of claim 1, wherein the resource for establishing the D2D connection with the second UE comprises an acquired resource in a discontinuous transmission (DTX) cycle.

4. A user equipment (UE), comprising:
a storage medium including executable instructions; and
a processor, wherein the executable instructions, when executed by the processor, cause the UE to:
send an attach request message to a base station for triggering the base station to allocate a resource for broadcasting information of the UE, wherein the attach request message triggers the base station to send an initial UE message that includes the attach request message in a non-access-stratum protocol data unit (NAS-PDU) information element of the initial UE message to a mobility management entity, the attach request message comprises a device-to-device (D2D) capability of the UE and an indication for a bearer for a D2D connection, the initial UE message indicates the mobility management entity to send an initial context setup request message that includes an attach accept message in a NAS-PDU information element of the initial context setup request message to the base station, and the initial context setup request indicates that a D2D function is supported in a UE radio capability information element of the initial context setup request message;
in response to sending the attach request message, receive information about the resource for broadcasting the information of the UE; and
broadcast the information of the UE on the resource for establishing the D2D connection with another UE, wherein the information of the UE comprises an identifier of the UE and a service code of the UE, and the service code of the UE indicates application layer service information.

5. The UE of claim 4, wherein a protocol stack of an air interface between the UE and the another UE comprises a user plane protocol stack, wherein the user plane protocol stack comprises at least one of internet protocol, media access control-d (MAC-d) information, and physical layer information.

6. The UE of claim 4, wherein the resource for establishing the D2D connection comprises an acquired resource in a discontinuous transmission (DTX) cycle.

7. An apparatus configured in a user equipment (UE), comprising:
a storage medium storing executable instructions; and
a processor, wherein the executable instructions, when executed by the processor, cause the UE to:
send an attach request message to a base station for triggering the base station to allocate a resource for broadcasting information of the UE, wherein the attach request message triggers the base station to send an initial UE message that includes the attach request message in a non-access-stratum protocol data unit (NAS-PDU) information element of the initial UE message to a mobility management entity, the attach request message comprises a device-to-device (D2D) capability of the UE and an indication for a bearer for a D2D connection, the first message indicates the mobility management entity to send an initial context setup request message that includes an attach accept message in a NAS-PDU information element of the initial context setup request message to the base station, and the initial context setup request message indicates that a D2D function is supported in a UE radio capability information element of the initial context setup request message;

in response to sending the attach request message, receive information about the resource for broadcasting the information of the UE; and broadcast the information of the UE on the resource for establishing the D2D connection with another UE, wherein the information of the UE comprises an identifier of the UE and a service code of the UE, wherein the resource is allocated by the base station, and the service code of the UE indicates application layer service information.

8. The apparatus of claim 7, wherein a protocol stack of an air interface between the UE and the another UE comprises a user plane protocol stack, wherein the user plane protocol stack comprises at least one of internet protocol, media access control-d (MAC-d) information, and physical layer information.

9. The apparatus of claim 7, wherein the resource for establishing the D2D connection comprises an acquired resource in a discontinuous transmission (DTX) cycle.

10. A non-transitory computer-readable storage medium storing instructions that, when executed by a processor, cause a user equipment (UE) to carry out steps of:

sending an attach request message for triggering the base station to allocate a resource for broadcasting information of the UE, wherein the attach request message triggers the base station to send an initial UE message that includes the attach request message in a non-access-stratum protocol data unit (NAS-PDU) information element of the initial UE message to a mobility management entity, the attach request message comprises a device-to-device (D2D) capability of the UE and an indication for a bearer for a D2D connection, the initial UE message indicates the mobility management entity to send an initial context setup request message that includes an attach accept message in a NAS-PDU information element of the initial context setup request message to the base station, and the initial context setup request message indicates that a D2D function is supported in a UE radio capability information element of the initial context setup request message;

in response to sending the attach request message, receiving information about the resource for broadcasting the information of the UE; and broadcasting information of the UE on the resource for establishing the D2D connection with another UE, wherein the information of the UE comprises an identifier of the UE and a service code of the UE, and the service code of the UE indicates application layer service information.

11. The non-transitory computer-readable storage medium of claim 10, wherein a protocol stack of an air interface between the UE and the another UE comprises a user plane protocol stack, wherein the user plane protocol stack comprises at least one of internet protocol, media access control-d (MAC-d) information, and physical layer information.

12. The non-transitory computer-readable storage medium of claim 10, wherein the resource for establishing the D2D connection comprises an acquired resource in a discontinuous transmission (DTX) cycle.

* * * * *